US012732984B2

(12) United States Patent
Elshafie et al.

(10) Patent No.: US 12,732,984 B2
(45) Date of Patent: Sep. 8, 2026

(54) SR FOR EH DEVICES

(71) Applicant: QUALCOMM Incorporated, San Diego, CA (US)

(72) Inventors: Ahmed Elshafie, San Diego, CA (US); Diana Maamari, San Diego, CA (US); Linhai He, San Diego, CA (US); Wei Yang, San Diego, CA (US); Huilin Xu, Temecula, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 18/179,301

(22) Filed: Mar. 6, 2023

(65) Prior Publication Data

US 2024/0306140 A1 Sep. 12, 2024

(51) Int. Cl.
*H04W 72/12* (2023.01)
*H04W 72/21* (2023.01)
*H04W 72/566* (2023.01)

(52) U.S. Cl.
CPC .......... *H04W 72/12* (2013.01); *H04W 72/21* (2023.01); *H04W 72/566* (2023.01)

(58) Field of Classification Search
CPC ... H04W 72/12; H04W 72/21; H04W 72/566; H04W 52/04
See application file for complete search history.

(56) References Cited

U.S. PATENT DOCUMENTS

| | | | | |
|---|---|---|---|---|
| 8,723,642 | B2 * | 5/2014 | Park | G07F 15/006 455/343.1 |
| 2021/0075552 | A1 * | 3/2021 | Huang | H04L 1/1854 |
| 2021/0185685 | A1 * | 6/2021 | Ryu | H04W 72/02 |
| 2022/0239423 | A1 * | 7/2022 | Zhu | H04L 5/001 |
| 2022/0321304 | A1 * | 10/2022 | Davydov | H04L 5/023 |
| 2024/0080813 | A1 * | 3/2024 | Xue | H04L 1/0027 |

FOREIGN PATENT DOCUMENTS

| | | | | |
|---|---|---|---|---|
| CN | 110022269 A | * | 7/2019 | H04L 41/0803 |
| KR | 20080079630 A | * | 9/2008 | H04L 5/0055 |

* cited by examiner

*Primary Examiner* — Zhensheng Zhang
(74) *Attorney, Agent, or Firm* — Procopio, Cory, Hargreaves & Savitch LLP

(57) ABSTRACT

A UE may generate an energy information or energy request message. The energy information or energy request message may be associated with the UE. The UE may transmit, for a first node, the energy information or energy request message multiplexed with an SR via a communication channel. In one or more configurations, the communication channel may be one of a PUCCH or a PSFCH. In one configuration, the first node may be a network entity, and the communication channel may be the PUCCH. In another configuration, the first node may be a second UE, and the communication channel may be the PSFCH. The first node may perform a communication operation or an energy operation associated with the UE based on at least one of the energy information or energy request message or the SR.

26 Claims, 18 Drawing Sheets

700

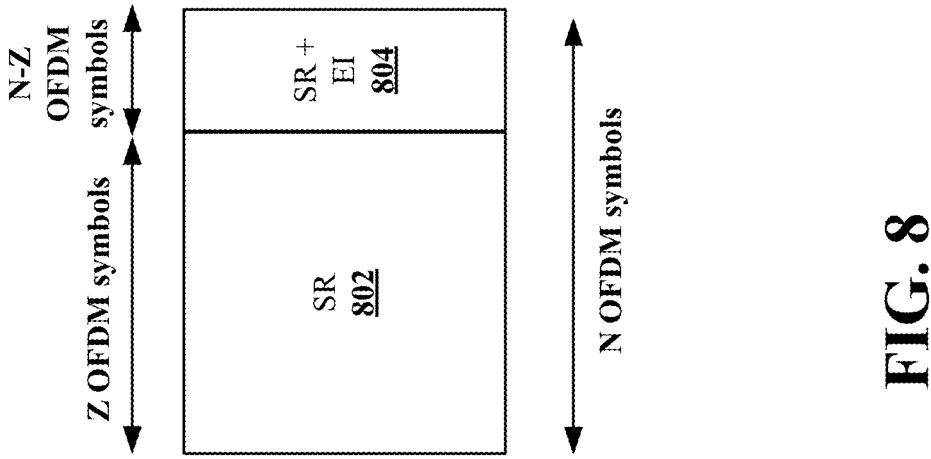
FIG. 8

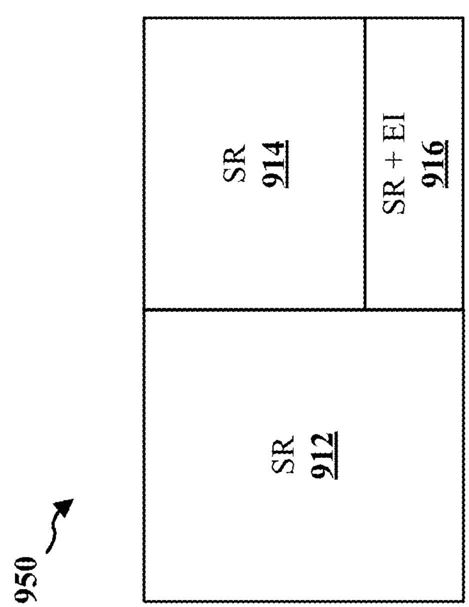
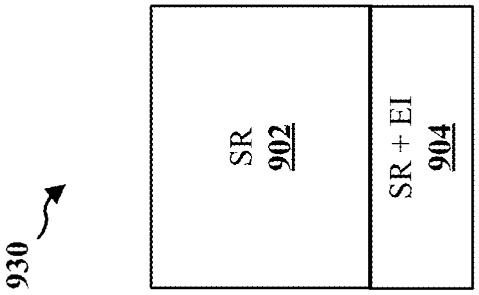
FIG. 9

1000

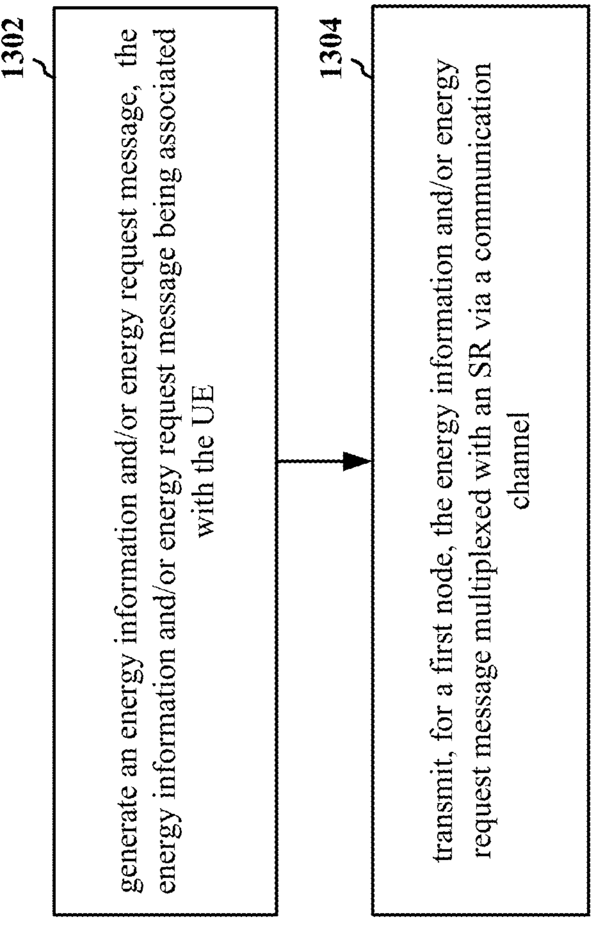
FIG. 13

SR FOR EH DEVICES

TECHNICAL FIELD

The present disclosure relates generally to communication systems, and more particularly, to transmission of energy information by energy harvesting devices in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may generate an energy information and/or energy request message. The energy information and/or energy request message may be associated with the UE. The apparatus may transmit, for a first node, the energy information and/or energy request message multiplexed with a scheduling request (SR) via a communication channel.

In an aspect of the disclosure, a method, a computer-readable medium, and an apparatus are provided. The apparatus may be a first node. The apparatus may receive an energy information and/or energy request message multiplexed with an SR via a communication channel from a UE. The energy information and/or energy request message may be associated with the UE. The apparatus may perform a communication operation or an energy operation associated with the UE based on at least one of the energy information and/or energy request message or the SR.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a diagram illustrating an example allocation of orthogonal frequency division multiplexing (OFDM) symbols for the combined energy information indication and SR.

FIG. 9 is a diagram illustrating example resource allocations for the combined energy information indication and SR.

FIG. 13 is a flowchart of a method of wireless communication.

DETAILED DESCRIPTION

Figure 1:
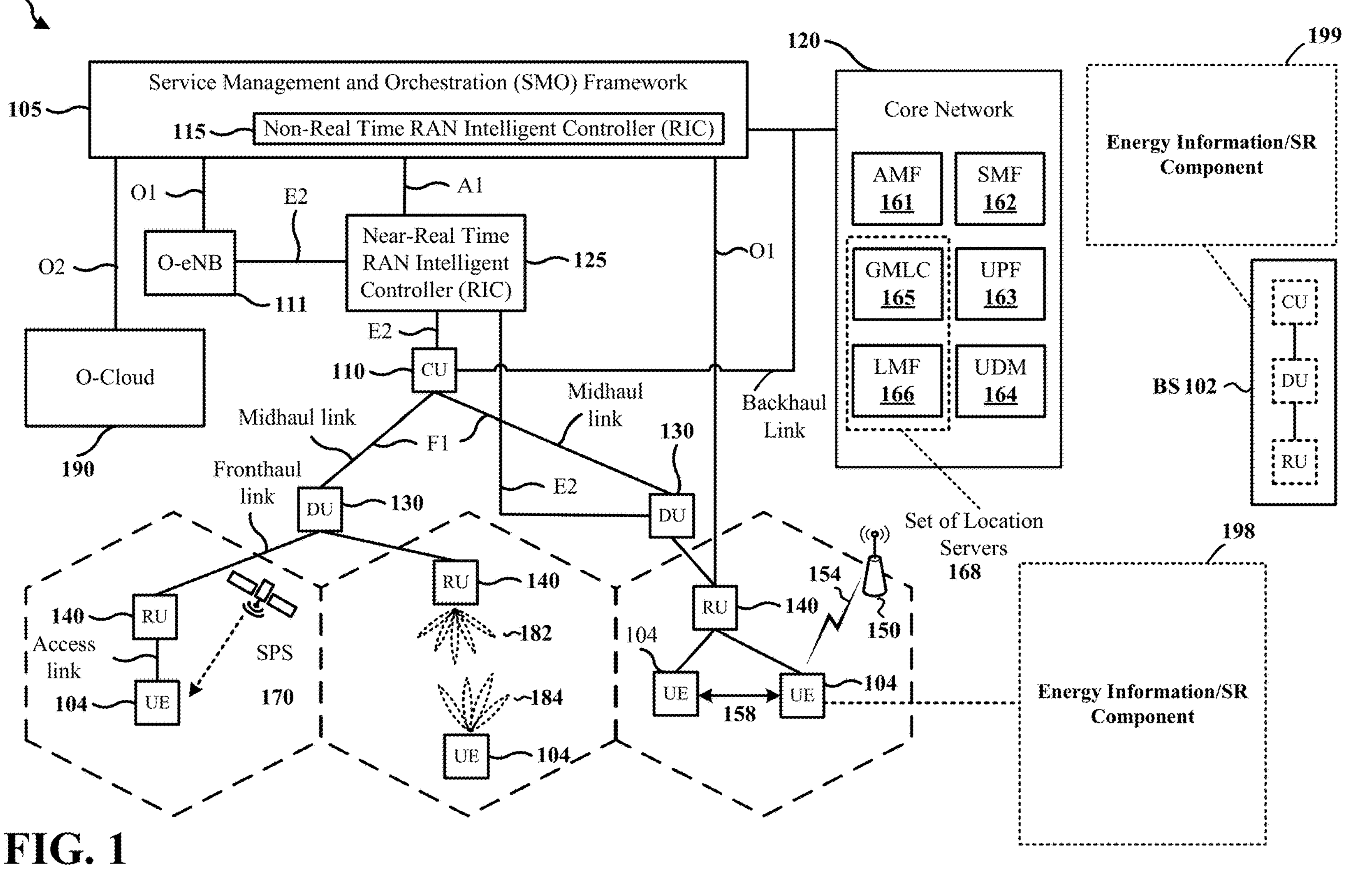
FIG. 1 is a diagram illustrating an example of a wireless communications system and an access network.

Passive IoT devices may be low cost (e.g., less than one dollar) and low power (e.g., less than 100 uWs) devices that may be used for such cases as identification, tracking, or sensing, etc. Energy harvesting and/or backscatter communication techniques may be implemented at passive IoT devices. For example, energy harvesting enabled communication services (EHECS) in a cellular wireless communication system (e.g., a 5G system, a 6G system, or some other cellular wireless communication systems including future cellular wireless communication systems) may enable communication at battery-less devices or other devices with limited energy storage capabilities (e.g., a device equipped with a capacitor for energy storage).

Various aspects relate generally to a UE. The UE may generate an energy information and/or energy request message. The energy information and/or energy request message may be associated with the UE. The UE may transmit, for a first node, the energy information and/or energy request message multiplexed with an SR via a communication channel. Accordingly, an energy harvesting device with limited energy storage capabilities may transmit the energy information and/or energy request message or the energy request message in an energy efficient manner. Hereinafter an energy harvesting UE/device may refer to any of a modem that harvests energy then uses the harvested energy to communicate using any interface, a zero power IoT device, an ambient IoT device, a passive IoT device, a semi-passive IoT device, or an active IoT device (in contrast to (semi-)passive IoT devices, an active IoT device may generate its own signal).

The interface may be composed of a communication system that may use a sinewave (single tone) or multi-tone (OFDM-based) waveform (radio frequency (RF) waveforms) transmitted by a first device and reflected/backscattered by an energy harvesting device (e.g., a second device). The first device may refer to a network unit, an integrated access band backhaul (IAB) relay, a relay node, a radio access network (RAN) node, a gNB, a transmission reception point (TRP) associated with the network, a sidelink UE (a remote unit, a primary unit, a programmable logic controller (PLC), or a controlling unit in sidelink), a Uu link UE. The first device may transmit the waveform or RF signals described above. The waveform generated by the first device may carry a data signal (e.g., a physical downlink shared channel (PDSCH), a physical uplink shared channel (PUSCH), a physical sidelink shared channel (PSSCH), among other examples), a reference signal (e.g., a channel state information-reference signal (CSI-RS), a sounding reference signal (SRS), a synchronization signal block (SSB), among other examples), or random data or reference signal signals/symbols across different sub-channels/resource elements (REs). In some examples, the waveform may be a sub-channels modulated OFDM signal/waveform or a time-domain modulated OFDM-based signal/waveform. The communication signals in the interface may refer to a modulated waveform/signal generated, based on the capability of the energy harvesting device, by the energy harvesting device, where the waveform may be one of a sinewave (single tone) or a multi-tone wave (e.g., OFDM-based waveform). In some examples, the modulation used may be one of on-off keying (OOK), amplitude-shift keying (ASK), frequency-shift keying (FSK), phase-shift keying (PSK), Zadoff-Chu, discrete Fourier transform (DFT), Walshi/Hadamard, Gold, Reed-Solomon, m-sequence, Chirp, among other examples. In some examples, modulation may occur in time domain or frequency domain or jointly. In some examples, Manchester coding may be used with ASK or OOK. In some example, forward error correction codes and other channel coding may be applied to achieve higher reliability.

In some aspects, a UE may use two different interfaces, where one (e.g., a first) interface may be associated with a high power mode (or no to low power saving mode) or some radio resource control (RRC) states, which may be associated with a Uu or PC5-like interface, and another (e.g., a second) interface (associated with the same radio as the first interface with deactivation of one or more of RF/hardware/software/firmware components or with a separate radio (e.g., backscatter-based) similar to a tag (passive or semi-passive)) to be used with low to very low power saving modes (where UE may maximize the power saving). In some aspects, there may be associated between the interface and the type of signal. For example, if the signal is low priority or less important than data and regular/legacy uplink (UL) signals (e.g., a HARQ-ACK, a channel state information (CSI) report, etc.), the second interface may be used. If the signal is important (e.g., data), the first interface may be used. In some cases, the network may assign different signals to different interfaces based on one of a priority, quality-of-service (QOS) specifications, and power saving at the network and the UE as well as based on reported energy information at the UE (e.g., an energy charging rate profile, a discharging/power consumption rate profile, an energy state/level profile, a discontinuous reception (DRX) cycle configuration, a discontinuous transmission (DTX) cycle configuration, a unified/aligned cycle configuration for transmission and reception (and a request for this mode of operation where signal transmission and reception may occur on same/aligned cycles), a time separation/gap/offset (or to stop monitoring) between two signals (e.g., between a transmitted signal and a received signal, between a received signal and a transmitted signal, between two transmitted signals, or between two received signals, etc.), among other examples), or based on UE preferences and traffic (e.g., the UE may ask for certain mapping between signals and interfaces using layer 1 (L1)/layer 2 (L2)/layer 3 (L3) signaling (dedicated or piggybacked/multiplexed with other signals)) and the network may configure using L1/L2/L3 signaling (e.g., L3/RRC signaling including uplink assistance information (UAI)).

Multiplexing the energy information and/or request indication/report with the SR, or otherwise using the SR for the indication of the energy information and/or request (i.e., piggybacking the energy information and/or request indication/report to the SR) may be beneficial because the UE (e.g., an energy harvesting UE) may reduce the number of signals transmitted and thereby save power. This may be important for UEs with a limited power storage/battery capacity.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network.

The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an energy information/SR component 198 that may be configured to generate an energy information and/or energy request message. The energy information and/or energy request message may be associated with the UE. The energy information/SR component 198 may be configured to transmit, for a first node, the energy information and/or energy request message multiplexed with an SR via a communication channel. In certain aspects, the base station 102 may have an energy information/SR component 199 that may be configured to receive an energy information and/or energy request message multiplexed with an SR via a communication channel from a UE. The energy information and/or energy request message may be associated with the UE. The energy information/SR component 199 may be configured to perform a communication operation or an energy operation associated with the UE based on at least one of the energy information and/or energy request message or the SR.

Figures 2A, 2B, 2C, 2D:
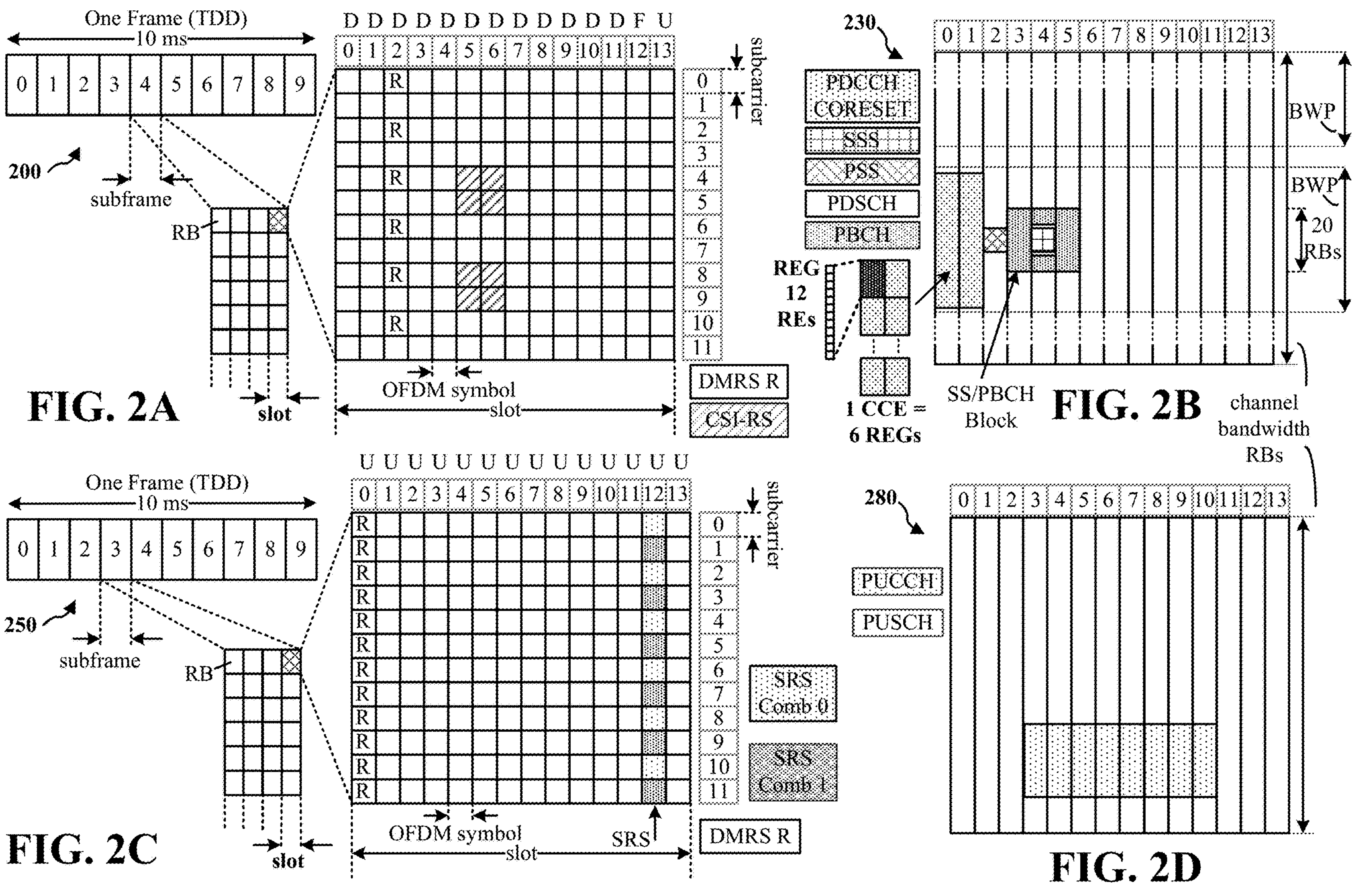
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2" slots/subframe. The subcarrier spacing may be equal to $2^{\mu}$*15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
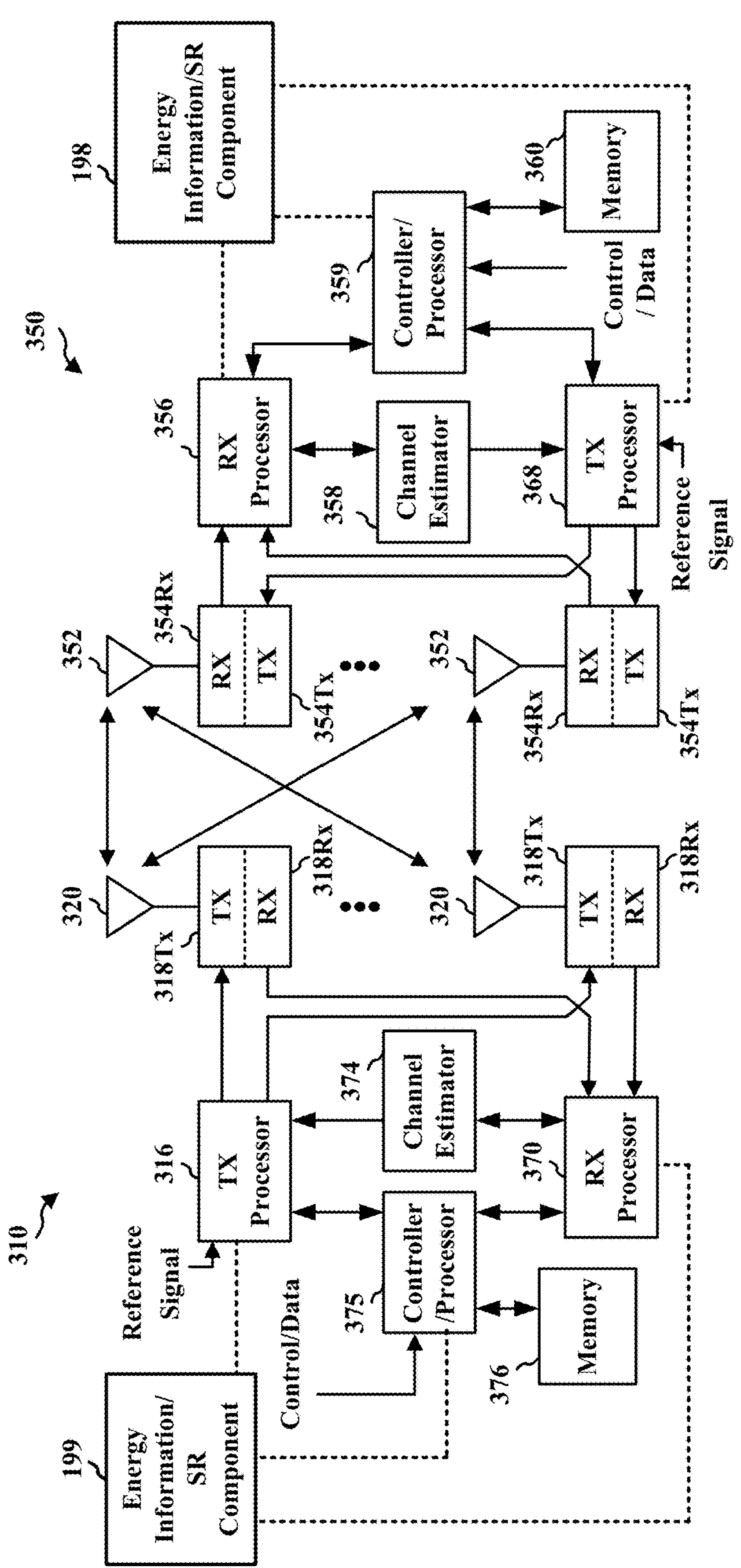
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the energy information/SR component 198 of FIG. 1.

At least one of the TX processor 316, the RX processor 370, and the controller/processor 375 may be configured to perform aspects in connection with the energy information/SR component 199 of FIG. 1.

Passive IoT devices may be low cost (e.g., less than one dollar) and low power (e.g., less than 100 uWs) devices that may be used for such cases as identification, tracking, or sensing, etc. Energy harvesting and/or backscatter communication techniques may be implemented at passive IoT devices. For example, energy harvesting enabled communication services (EHECS) in a cellular wireless communication system (e.g., a 5G system, a 6G system, or some other cellular wireless communication systems including future cellular wireless communication systems) may enable communication at battery-less devices or other devices with limited energy storage capabilities (e.g., a device equipped with a capacitor for energy storage). These devices may be used for one or more of power sourcing, security, access control, connectivity management, or positioning, etc.

Examples of passive IoT devices may include low energy tags (e.g., Bluetooth low energy tags), sensors (e.g., energy harvesting sensors based on thermal or (indoor) solar energy harvesting or printed battery sensors) (e.g., vibration sensors, temperature sensors, humidity sensors, pressure sensors, gas sensors, accelerometers, light sensors, positioning sensors, etc.), smart labels, and so on. In some configurations, the passive IoT devices may communicate based on the narrowband IoT (NB-IoT) technique. Hereinafter the passive IoT devices may be referred to simply as UEs.

In a wireless communication system, a UE (e.g., a passive IoT device) may indicate, to the network, energy information (e.g., an energy report or an energy request) together with an SR, as the occasions for transmitting the SRs may be suitable times for sharing the energy information (energy report and/or request) with the network.

In one or more configurations, the term energy information used hereinafter may be or may include at least one of an energy charging rate profile, an energy discharging rate profile, or an energy state profile. In addition, an energy request (or an energy request report) may be associated with at least one form of wireless energy (e.g., laser, RF, or other wireless energy form supported by the current network) to achieve a certain Tx data rate and/or a certain Rx data rate, to decode at least one data packet, to receive at least one control packet, to transmit at least one data packet with a certain configured or agreed power level, or any combination thereof. In some configurations, the number of packets to process, the size/payload of the packets, the modulation and coding scheme (MCS) associated with the packets, and/or the number of used time/frequency resources may impact the energy requested by UE.

In some configurations, the UE may not send anything at an SR occasion if the UE has no (high priority) data in the buffer to transmit. In some configurations, to enhance reliability, the UE may still transmit an indication (e.g., a "0") (e.g., with a particular cyclic shift (CS)) in an SR even when the UE has no data or no data update to transmit.

If the UE has data to send, the UE may indicate at the SR occasion, to the network, the current charging rate of the UE or some other information about the energy state of the UE (e.g., a charging rate desired by the UE) (which may be referred to as energy information and/or request), so that the network may perform operations based on the SR and the energy information and/or request indication. For example, the network may assign resources or TBs accordingly based on the SR. In another example, the network may configure uplink grants based on the SR. In yet another example, the network may configure a gap between grants based on the charging rate of the UE.

Multiplexing the energy information and/or request indication/report with the SR, or otherwise using the SR for the reporting of the energy information and/or request (i.e., piggybacking the energy information and/or request indication/report to the SR) may be beneficial because the UE (e.g., an energy harvesting UE) may reduce the number of signals transmitted and thereby save power. This may be important for UEs with a limited power storage/battery capacity.

In some configurations, each logical channel configuration ("LogicalChannelConfig") may be associated with (tied to) an SR. When the SR is triggered, a list of logical channel group identifier (LCGID) buffer status reports (BSRs) may be reported. A BSR including the corresponding logical channel group (LCG) BSR may be prepared. In other words, when data related to an LCG arrives and waits to be transmitted by the UE, the UE may use the earliest SR occasion that corresponds to (contains) the ID of this LCGID. Then, the UE may transmit, to the network, a BSR including information about all LCGIDs corresponding to the SR.

In some configurations, some SR occasions may be associated with the energy information and/or request indication (e.g., an energy information report or an energy request). In some configurations, the network (e.g., the base station) may configure some (virtual) LCGIDs for energy harvesting devices to indicate the energy information (e.g., energy information reports or energy requests). Accordingly, the UE may transmit the energy information and/or request indication at SR occasions associated with the configured (virtual) LCGIDs. When an SR is triggered under SR conditions (i.e., arrival of new data to be transmitted by the UE into an empty buffer at the UE or arrival of new high priority data to be transmitted by the UE), the UE may determine the LCGIDs to be included in the BSR to be reported by the UE. Then, the UE may transmit the energy information and/or request indication (e.g., an energy information report or an energy request) if one of the determined LCGIDs is an LCGID configured for the energy harvesting devices to indicate the energy information and/or request. In some configurations, some LCGIDs may be reserved for the energy information and/or request indication (e.g., energy information reports or energy requests).

In some configurations, some logical channel identifiers (LCIDs) associated with the energy information and/or request indication (or virtual LCIDs for energy harvesting devices to indicate the energy information and/or request) may be associated with energy information and/or request indication types (e.g., contents of the indication/report). For example, some (virtual) LCIDs may be associated with a first indication type, where the first indication type may correspond to the energy request. Some other example (virtual) LCIDs may be associated with a second indication type, where the second indication type may correspond to the full energy information report. Yet some other example (virtual) LCIDs may be associated with a third indication type, where the third indication type may correspond to the energy information report including a subset of all energy report information. Still some other example (virtual) LCIDs may be associated with a fourth indication type, where the fourth indication type may correspond to the combined full energy information report and energy request. The energy information and/or request indication types described herein may be examples and do not limit the disclosure. Other suitable energy information and/or request indication types may also be used.

In some configurations, the configuration of the indication types (which may correspond to specified contents in the energy information and/or request indication) may be prespecified, or may be provided by the network in an indication or configuration (e.g., a configuration of the SR) (e.g., an indication via L1/L2/L3 signaling).

In some configurations, the network may trigger, via (e.g., L1/L2/L3) signaling, the transmission by the UE of an energy information and/or request indication at one or more upcoming SR occasions. The signaling that triggers the transmission of the energy information and/or request indication may also include an indication of the type of the energy information and/or request indication (e.g., an energy information report and/or an anergy request, the contents of the energy information and/or request indication, etc.). In some configurations, the signaling that triggers the transmission of the energy information and/or request indication may be an L1/DCI (e.g., a scheduling or non-scheduling control signal). Accordingly, the UE may transmit the energy information and/or request indication to the network at the one or more upcoming SR occasions based on the trigger from the network.

Figure 4:
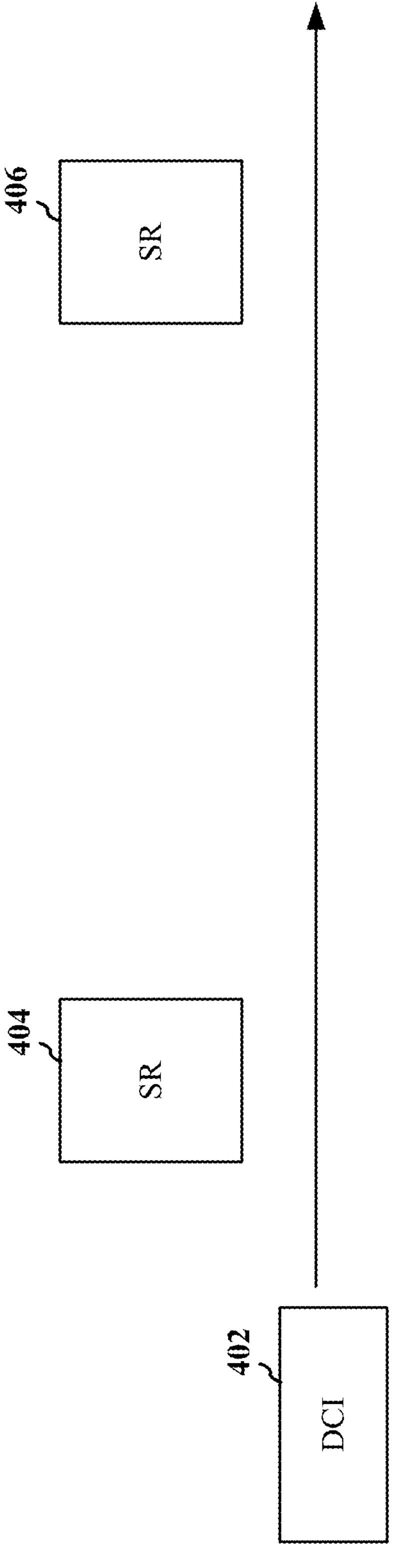
FIG. 4 is a diagram illustrating transmission of the energy information indication at SR occasions based on a network provided triggering signal.

FIG. 4 is a diagram 400 illustrating transmission of the energy information and/or request indication at SR occasions based on a network provided triggering signal. As shown, the DCI message 402 may trigger the transmission by the UE of the energy information and/or request indication. Based on the DCI message 402, i.e., the trigger, the UE may transmit one or more energy information and/or request indications at one or both of the SR occasions 404, 406. In some configurations, instead of using the SR occasions 404, 406, the UE may also transmit energy information and/or request indications via (e.g., L1/L2/L3) signaling based on the DCI message 402.

In one or more configurations, in response to and based on an indication received via the (e.g., L1/L2/L3) signaling from the network (e.g., a base station) (or from another UE in case of a sidelink), the UE may indicate, to the network (or to the other UE in case of a sidelink), energy information and/or request (e.g., energy information reports and/or energy requests). In one or more configurations, to transmit the energy information and/or request indication, the UE may multiplex the energy information and/or request indication with an SR at an SR occasion (e.g., piggybacking the energy information and/or request indication to the SR). Accordingly, the UE may convey the energy information and/or request to the network (or the other UE in case of a sidelink) in an energy efficient manner that takes into account the energy usage/collection capabilities of the UE (e.g., an energy harvesting device).

In one or more configurations, the energy information and/or request indication provided by the UE may include an energy information report and/or an energy request. In one example, the energy information and/or request indication may include a time offset (e.g., calculated from the time of the energy information and/or request indication) associated with a UL transmission or a DL transmission. In another example, the energy information and/or request indication may include an indication of a time gap between two consecutive allocations that may include at least one reception by the UE and at least one transmission by the UE. In particular, the time gap may be associated with a gap profile across time. In yet another example, the energy information and/or request indication may include a charging profile associated with one or more energy harvesting techniques supported by the UE (the UE may support multiple energy harvesting techniques). In particular, the charging profile may include a charging rate or a predicted charging rate of the UE for at least one of a number of slots, a number of times, a current time, or a charging time period. In yet another example, the energy information and/or request indication may include a charging satisfaction indication that may indicate the meeting or exceeding of a configured energy threshold at one or more time slots. In particular, the charging satisfaction indication may be associated with one or more charging/energy harvesting techniques supported (used) by the UE, and may be based on a threshold (e.g., the configured energy threshold). In different configurations, one or more thresholds used herein may be associated with an energy harvesting UE class, configurations using L1/L2/L3 signaling, or configurations multiplexed with L1/L2/L3 signaling. Further, the one or more thresholds may be based on at least one of a device capability, a configuration, or a negotiation between devices.

In yet another example, the energy information and/or request indication may include a discharging or power consumption profile based at least in part on one or more of current data scheduling at the UE, grants, the transmission power, or a battery or energy storage discharging rate (e.g., associated with imperfections or leakage). In particular, the discharging or power consumption profile may include a discharging rate and/or a power consumption at the current time or during a consumption time period. In yet another example, the energy information and/or request indication may include a battery status profile that may include a current battery status and/or a predicted battery status over at least one of time, one or more time slots, or one or more (other) time units. In yet another example, the energy information and/or request indication may include an indication of an energy harvesting cycle duration and/or an indication of a time within an energy harvesting duration including at least one time unit. In particular, the energy harvesting cycle duration and/or the time within an energy harvesting duration may be configured based on at least one of an L1/L2/L3 configuration, a static configuration, or a semi-static configuration associated with the network. The energy harvesting cycle duration and/or the time within the energy harvesting duration may be associated with an energy harvesting profile or a current UE energy harvesting characteristic that may correspond to a configured time window for energy information and/or request reporting.

In yet another example, the energy information and/or request indication may include an indication of an amount of data to receive and decode in the DL in a number of subsequent reception grants or a decoding time duration. In particular, the number of subsequent reception grants associated with the amount of DL data may be preconfigured or configured based on an L1/L2/L3 configuration. In yet another example, the energy information and/or request indication may include an amount of data to transmit in the UL in a number of next transmission grants or a transmission time duration. In particular, the amount of data to transmit in the UL may be associated with a power level of the UE (e.g., a configured power level, a preconfigured power level, or a reference power level). In yet another example, the energy information and/or request indication may include an indication of at least one of a DL TB size, a UL TB size, or an amount of sidelink data (e.g., a number of bits) that the UE may be configured to process in a given time interval associated with processing of a transmission (e.g., a sidelink transmission) (each time interval may include a number of TBs, which may also be indicated in the energy information and/or request indication). In particular, the at least one of the DL TB size, the UL TB size, or the amount of sidelink data may be associated with multiple time intervals that may be respectively preconfigured or configured based on an L1/L2/L3 configuration. In another example, the at least one of the DL TB size, the UL TB size, or the amount of sidelink data may be associated with a TB size profile.

In one example, the energy information and/or request indication may include a charging rate to support a UL BSR. In another example, the energy information and/or request indication may include an additional charging rate from at least one wireless energy provider. In particular, the additional charging rate may be in addition to any currently received charging rates. Further, the charging rate may be associated with one or more of RF wireless charging, laser-based charging, light-based charging, thermal-based charging, wind-based charging, or a printed battery. In further examples, the charging rate may be based on a charging profile over time.

As described above, to transmit the energy information and/or request indication, the UE may multiplex the energy information and/or request indication (e.g., an energy information report and/or an energy request) with an SR (transmitted to the network (e.g., a base station) (or another UE in case of a sidelink) at an SR occasion. The multiplexed transmission may be hereinafter referred to as a combined energy information and/or request indication and SR. In some configurations, the UE may transmit the combined energy information and/or request indication and SR via a PUCCH (e.g., over a Uu link between the UE and the base station) or a physical sidelink feedback channel (PSFCH) Format 0 (in case of a sidelink between the UE and another UE). For a 2-symbol PUCCH (or a 2-symbol PSFCH Format 0 in case of a sidelink), in one configuration, the UE may multiplex the energy information and/or request indication with the SR using a joint CS before the encoding. In another configuration, to multiplex the energy information and/or request indication with the SR, the UE may encode the energy information and/or request indication and the SR separately using different CSs (e.g., with a same power level, or with different power levels). In one configuration, for a 2-symbol PUCCH (but not for a PSFCH), the UE may transmit the energy information and/or request indication in a first symbol of the PUCCH and may transmit the SR in a second symbol (different from the first symbol) of the PUCCH.

For a 1-symbol PUCCH (the 1-symbol configuration may not work for the PSFCH because the first OFDM symbol may be used for the automatic gain control (AGC) in the sidelink) used for the transmission of the combined energy information and/or request indication and SR, in one configuration, the UE may multiplex the energy information and/or request indication with the SR using a joint CS before the encoding. In another configuration, to multiplex the energy information and/or request indication with the SR, the UE may encode the energy information and/or request indication and the SR separately using different CSs (e.g., with a same power level, or with different power levels).

In one or more configurations, a priority level may be defined and provided for the energy information and/or request indication multiplexed with the SR, so that multiplexing and/or dropping may be applied by the UE where the SR bits (e.g., bits at the SR occasion) may be used entirely for the energy information and/or request indication. The priority level may be useful for encoding as well as multiplexing and dropping associated with other channels.

In some configurations, to transmit a 2-bit HARQ-ACK (e.g., with a same priority) via a PUCCH Format 0, the UE may transmit a based sequence S with a certain CS amount in the time domain. The CS amount may be dependent upon the value of the HARQ-ACK information bits.

Figure 5:
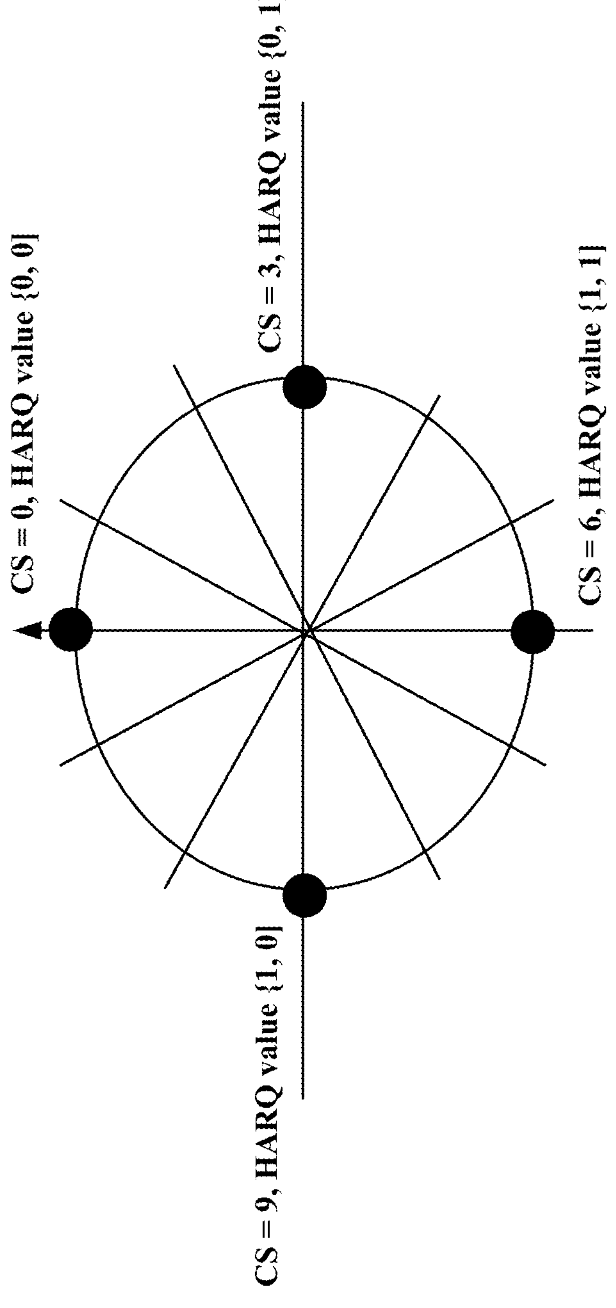
FIG. 5 is an example diagram illustrating cyclic shift (CS) amounts associated with different hybrid automatic repeat request-acknowledgement (HARQ-ACK) values.

FIG. 5 is an example diagram 500 illustrating CS amounts associated with different HARQ-ACK values. As shown, the HARQ-QCK values of {0, 0}, {0, 1}, {1, 1}, and {1, 0} may be associated with CS amounts (i.e., for the sequence) of 0, 3, 6, and 9, respectively. It should be appreciated that in this example, the distance between consecutive CS amounts may be equal (i.e., the distance may be 3).

In some configurations, the UE may transmit the combined energy information and/or request indication and SR (which may be denoted as {SR, energy information (EI)}) in a way similar to the way the UE transmits the 2-bit HARQ-ACK as described above.

Figure 6:
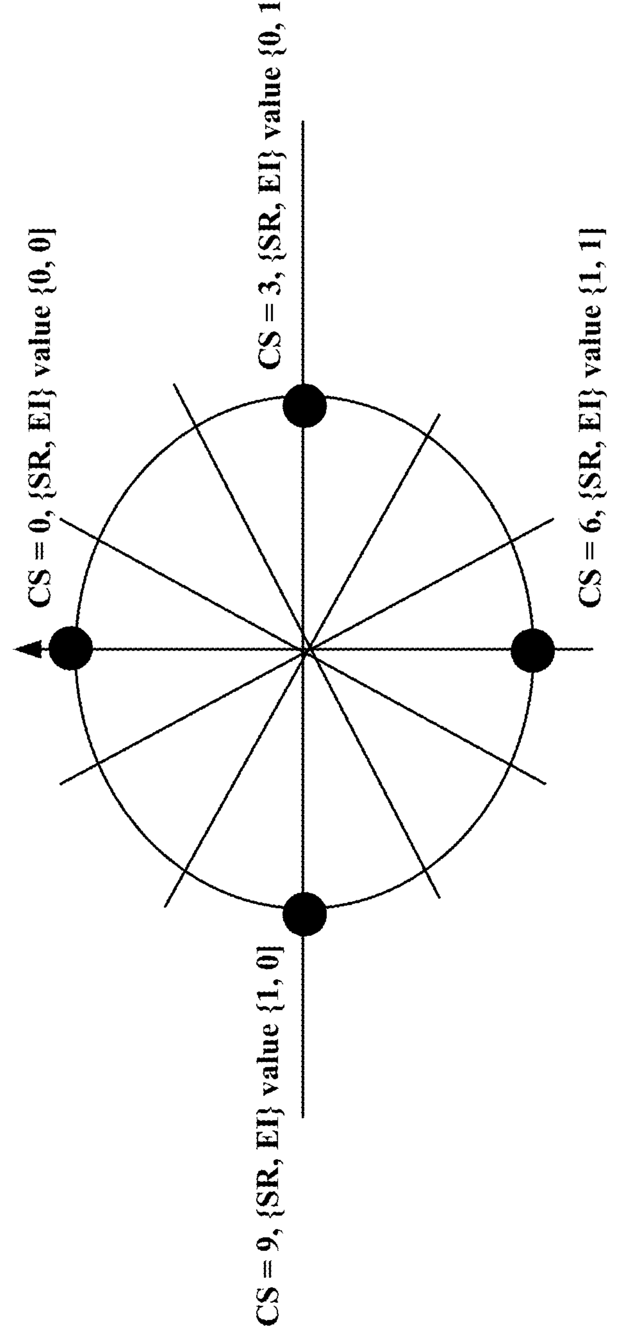
FIG. 6 is an example diagram illustrating CS amounts associated with different values for the combined energy information indication and SR.

FIG. 6 is an example diagram 600 illustrating CS amounts associated with different values for the combined energy information and/or request indication and SR. As shown, the {SR, EI} values of {0, 0}, {0, 1}, {1, 1}, and {1, 0} may be associated with CS amounts (i.e., for the sequence) of 0, 3, 6, and 9, respectively. Such equidistant CS amounts may be used when the energy information and/or request indication and the SR are associated with a same priority.

In some configurations, the CS amounts assigned to the sequences may be based on the priority of the information bits associated with the sequences. In particular, CS amounts that may result in less error may be used for higher priority information bits. Accordingly, for example, assuming the energy information and/or request indication is more important and has higher priority than the SR. CS amounts may be assigned to provide more reliability for the energy information and/or request indication in the combined energy information and/or request indication and SR.

Figure 7:
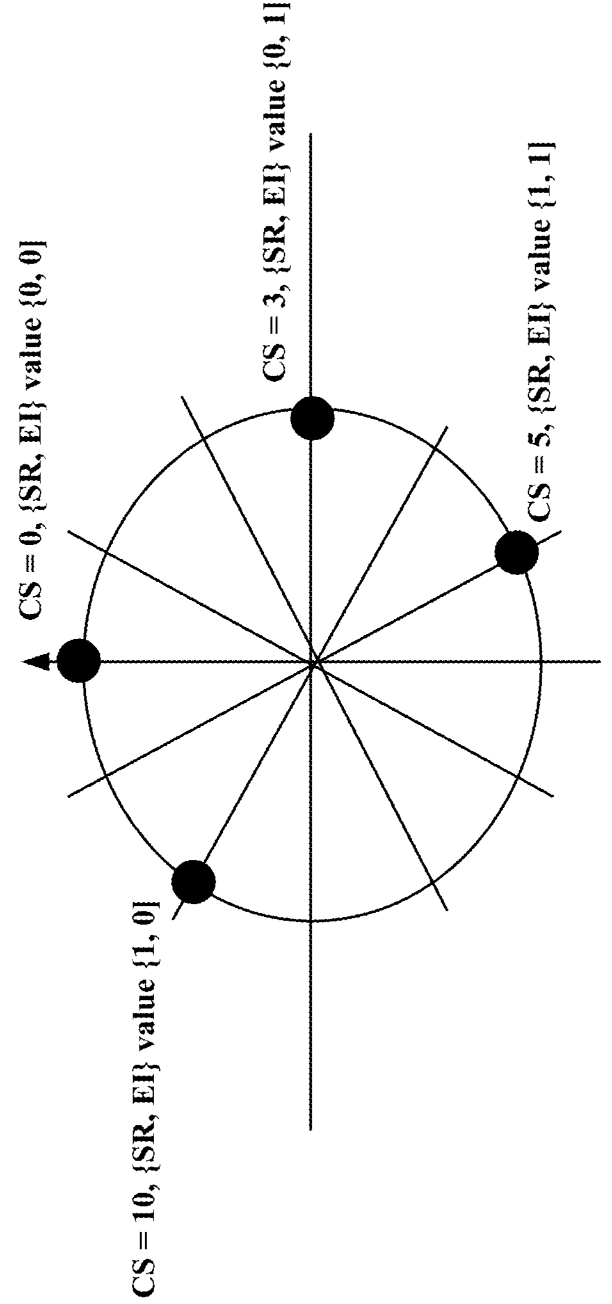
FIG. 7 is another example diagram illustrating CS amounts associated with different values for the combined energy information indication and SR.

FIG. 7 is another example diagram 700 illustrating CS amounts associated with different values for the combined energy information and/or request indication and SR. As shown, the {SR, EI} values of {0, 0}, {0, 1}, {1, 1}, and {1, 0} may be associated with CS amounts (i.e., for the sequence) of 0, 3, 5, and 10, respectively. Table 2 below may provide an example scheme for encoding the SR information and the energy information into 2-bit {SR, EI} codepoints.

TABLE 2

2-bit Encoding of SR and EI

| Codepoint (SR, EI) | Meaning |
|---|---|
| 00 | Negative SR + charging rate is < T |
| 01 | Negative SR + charging rate is > T |
| 10 | Positive SR + charging rate is < T |
| 11 | Positive SR + charging rate is > T |

Table 3 below may provide an example scheme for encoding the SR information and the energy request (ER) into 2-bit {SR, ER} codepoints. The values for the requested charging rate (e.g., X and/or Y) may be configured based on L1/L2/L3 indications. For example, for the Uu interface, an example L1 indication may be a DCI message (e.g., scheduling or non-scheduling DCI messages, a separate DCI message, a DCI message that leverages one or more of reserved bits, a different radio network temporary identifier (RNTI), or a different scrambling identifier (ID), or a DCI message multiplexed with a PDSCH or a reference signal, etc.). An example L2 indication may be a medium access control-control element (MAC-CE) (e.g., a dedicated MAC-CE, or a MAC-CE multiplexed with another MAC-CE). Further, an example L3 indication may be at least one of an RRC message, a MIB, a SIB1, another SIB, or a random access channel (RACH) message.

TABLE 3

2-bit Encoding of SR and ER

| Codepoint (SR, ER) | Meaning |
|---|---|
| 00 | Negative SR + specified charging rate or additional specified charging rate is X |
| 01 | Negative SR + specified charging rate or additional specified charging rate is Y |
| 10 | Positive SR + specified charging rate or additional specified charging rate is X |
| 11 | Positive SR + specified charging rate or additional specified charging rate is Y |

In another configuration, table 4 below may provide an example scheme for encoding the SR information, the energy information, and the energy request jointly into 3-bit (SR, EI, ER) codepoints.

TABLE 4

| 3-bit Encoding of SR, EI, and ER | |
|---|---|
| Codepoint (SR, EI, ER) | Meaning |
| 000 | Negative SR + charging rate is < T + specified charging rate or additional specified charging rate is X |
| 001 | Negative SR + charging rate is < T + specified charging rate or additional specified charging rate is Y |
| 010 | Negative SR + charging rate is > T + specified charging rate or additional specified charging rate is X |
| 011 | Negative SR + charging rate is > T + specified charging rate or additional specified charging rate is Y |
| 100 | Positive SR + charging rate is < T + specified charging rate or additional specified charging rate is X |
| 101 | Positive SR + charging rate is < T + specified charging rate or additional specified charging rate is Y |
| 110 | Positive SR + charging rate is > T + specified charging rate or additional specified charging rate is X |
| 111 | Positive SR + charging rate is > T + specified charging rate or additional specified charging rate is Y |

Accordingly, in some configurations, a 1-bit SR and a 1-bit energy information indication may be multiplexed into a 2-bit indication. In some configurations, the UE not transmitting any feedback may be used as an additional codepoint to indicate, e.g., the UE is not charged and the UE needs energy. In other examples, the codepoint may indicate another energy state for the UE. Table 5 below may also provide an example scheme for encoding the SR information and the energy information into 2-bit {SR, EI} codepoints where the UE not transmitting any feedback may be used as an additional codepoint. As shown in Table 5, when the UE does transmit a 2-bit {SR, EI} codepoint, the transmitted codepoint may be one of 4 possible transmitted codepoints. It should be appreciated that in the example shown, a 1-bit SR of "0" may correspond to a negative SR and a 1-bit SR of "1" may correspond to a positive SR.

TABLE 5

| 2-bit Encoding of SR and EI | |
|---|---|
| Codepoint (SR, EI) | Meaning |
| No feedback from UE | UE is not charged and it needs energy |
| 00 | Negative SR + charging rate is < T |
| 01 | Negative SR + charging rate is > T |
| 10 | Positive SR + charging rate is < T |
| 11 | Positive SR + charging rate is > T |

In another configuration, table 6 below may provide an example scheme for encoding the SR information and the energy request into 2-bit {SR, ER} codepoints where the UE not transmitting any feedback may be used as an additional codepoint.

TABLE 6

| 2-bit Encoding of SR and ER | |
|---|---|
| Codepoint (SR, ER) | Meaning |
| No feedback from UE | UE is not charged and it needs energy |
| 00 | Negative SR + specified charging rate or additional specified charging rate is X |

TABLE 6-continued

| 2-bit Encoding of SR and ER | |
|---|---|
| Codepoint (SR, ER) | Meaning |
| 01 | Negative SR + specified charging rate or additional specified charging rate is Y |
| 10 | Positive SR + specified charging rate or additional specified charging rate is X |
| 11 | Positive SR + specified charging rate or additional specified charging rate is Y |

In another configuration, table 7 below may provide yet another example scheme for encoding the SR information and the energy information into 2-bit {SR, EI} codepoints, where the energy information may include a DRX/DTX cycle configuration.

TABLE 7

| 2-bit Encoding of SR and EI | |
|---|---|
| Codepoint (SR, EI) | Meaning |
| 00 | Negative SR + DRX cycles |
| 01 | Negative SR + DTX cycles |
| 10 | Positive SR + DRX cycles |
| 11 | Positive SR + DTX cycles |

In another configuration, table 8 below may provide yet another example scheme for encoding the SR information and the energy information into 2-bit {SR, EI} codepoints, where the energy information may include an aligned DRX/DTX cycle configuration.

TABLE 8

| 2-bit Encoding of SR and EI | |
|---|---|
| Codepoint (SR, EI) | Meaning |
| 00 | Negative SR + aligned DRX/DTX cycles enabled |
| 01 | Negative SR + aligned DRX/DTX cycles disabled |
| 10 | Positive SR + aligned DRX/DTX cycles enabled |
| 11 | Positive SR + aligned DRX/DTX cycles disabled |

FIG. 8 is a diagram 800 illustrating an example allocation of OFDM symbols for the combined energy information and/or request indication and SR. As shown, the total OFDM symbols may include N OFDM symbols, which may include a first set of OFDM symbols 802 including Z OFDM symbols and a second set of OFDM symbols 804 including (N-Z) OFDM symbols. In one configuration, the SR may be associated with a higher priority than the energy information and/or request indication. Accordingly, the UE may transmit the SR via the first set of OFDM symbols 802 (e.g., 1 symbol in case of Format 0 or Format 2 (PF0/PF2)). Further, the UE may transmit the energy information and/or request indication together with a retransmission of the SR via the second set of OFDM symbols 804 (e.g., 1 symbol in case of PF0/PF2). In another configuration, the energy information and/or request indication may be associated with a higher priority than the SR. Accordingly, the UE may transmit the energy information and/or request indication via the first set of OFDM symbols 802 (e.g., 1 symbol in case of PF0/PF2). Further, the UE may transmit the SR together with a retransmission of the energy information and/or request indication via the second set of OFDM symbols 804 (e.g., 1 symbol in case of PF0/PF2).

In some configurations, the UE may transmit more than 2 bits via a PUCCH Format 2 or a PSFCH Format 2 (the PSFCH Format 2 described herein may become available in the future). In particular, a PUCCH Format 2 or a PSFCH Format 2 may include 1 or 2 OFDM symbols with up to 16 RBs. Accordingly, the UE may multiplex a 1-bit SR and a multiple-bit (e.g., X-bit) energy information and/or request indication via a PUCCH or a PSFCH. In some configurations, the PUCCH Format 2 or the PSFCH Format 2 may include 1 RB. For the 1-RB PUCCH/PSFCH Format 2, the UE may encode the combined energy information and/or request indication and SR on the level of the RE (so that each bit may be self-decodable). In another configuration, for the 1-RB PUCCH/PSFCH Format 2, the UE may encode the energy information and/or request indication and the SR in 2 bits jointly.

In some configurations, the PUCCH Format 2 or the PSFCH Format 2 may include more than 1 RB. For the PUCCH/PSFCH Format 2 including more than 1 RB, the UE may encode the combined energy information and/or request indication and SR on the level of the RE or the RB. In another configuration, for the PUCCH/PSFCH Format 2 including more than 1 RB, the UE may encode the energy information and/or request indication and the SR jointly.

In some configurations, when encoding the combined energy information and/or request indication and SR, the UE may use more REs/RBs for the part (i.e., the SR or the energy information and/or request indication) that is associated with a higher priority. For example, if the energy information and/or request indication (e.g., an initial energy information and/or request indication) is associated with a higher priority than the SR, and given that more than 2 bits may be transmitted via a PUCCH Format 2 or a PSFCH Format 2, the UE may transmit a 1-bit SR, and may use the remaining bits for the transmission of the energy information and/or request indication.

In some configurations, for PUCCH/PSFCH formats associated with multiple symbols and RBs, the UE may multiplex the combined energy information and/or request indication and SR before encoding. In some configurations, for PUCCH/PSFCH formats associated with multiple symbols and RBs, the UE may multiplex the combined energy information and/or request indication and SR after encoding. In one or more configurations, the UE may assign different resources to the energy information and/or request indication and the SR based on the priorities of the energy information and/or request indication and the SR, where the UE may assign more REs/RBs to the part (i.e., the energy information and/or request indication or the SR) associated with a higher priority. In one or more configurations, the number of resources for each message may be based on a configured coding rate or preconfigured assigned resources.

FIG. 9 is a diagram 900 illustrating example resource allocations for the combined energy information and/or request indication and SR. The diagram 930 shows a first example resource allocation. As shown, the SR may be associated with a higher priority than the energy information and/or request indication. Accordingly, the UE may transmit the SR via both the first set of resources 902 and the second set of resources 904, and may transmit the energy information and/or request indication via just the second set of resources 904. The diagram 950 shows a second example resource allocation. As shown, the SR may be associated with a higher priority than the energy information and/or request indication. Accordingly, the UE may transmit the SR via the first set of resources 912, the second set of resources 914, and the third set of resource 916, and may transmit the energy information and/or request indication via just the third set of resources 916.

Figure 10:
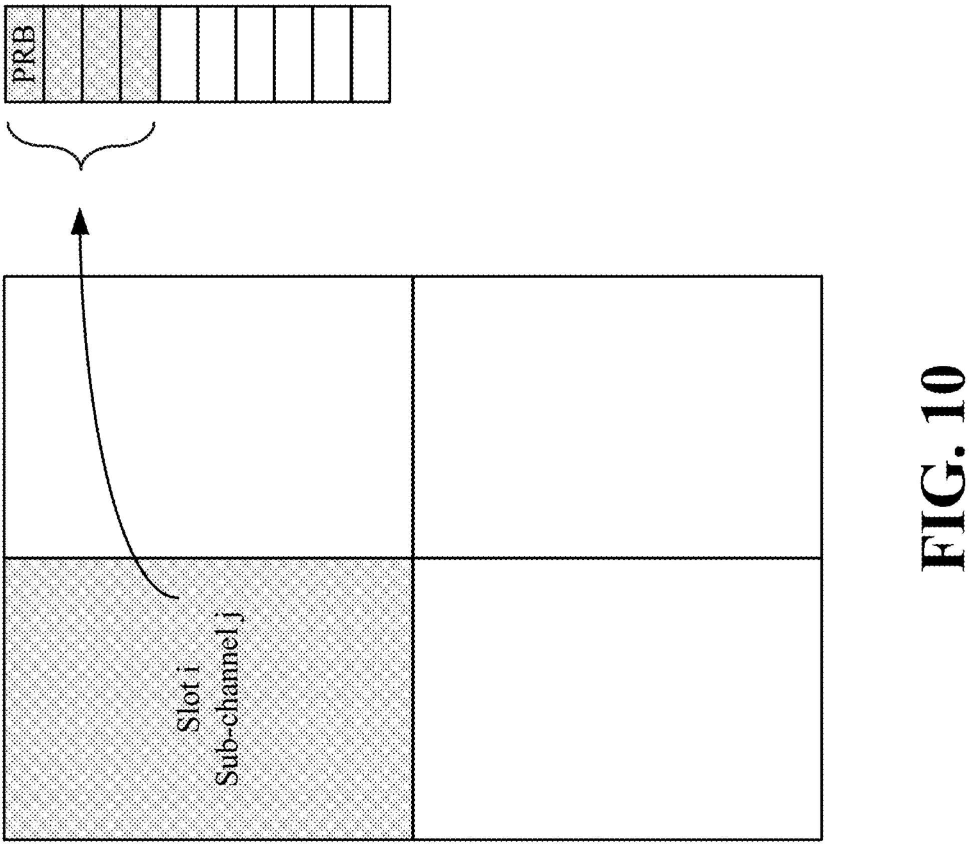
FIG. 10 is a diagram illustrating example physical sidelink feedback channel (PSFCH) resource mapping.

FIG. 10 is a diagram 1000 illustrating example PSFCH resource mapping. A mapping between a PSSCH and the corresponding PSFCH resource may be based on one or more of the starting sub-channel of a PSSCH (sl-PSFCH-CandidateResourceType is configured as startSubCH) or the number of sub-channels in a PSSCH (sl-PSFCH-CandidateResourceType is configured as allocSubCH), the slot containing the PSSCH, the source ID, and/or the destination ID. Further, the number of available PSFCH resources may be equal to or greater than the number of UEs in groupcast option 2.

In one or more configurations, periodPSFCHresource may indicate the PFSCH periodicity, in number of slots, in a resource pool. For example, periodPSFCHresource may be set to a value selected from the set {0, 1, 2, 4}. In particular, if periodPSFCHresource is set to 0, PSFCH transmissions from a UE in the resource pool may be disabled. Further, the UE may transmit the PSFCH in a first slot that may include PSFCH resources and may be at least a number of slots (provided by MinTimeGapPSFCH) of the resource pool after a last slot of the PSSCH reception. Moreover, rbSetPSFCH may be a set of $$M_{PRB,set}^{PSFCH}$$

PRBs in a resource pool for PSFCH transmission. numSubchannel may be a number of $N_{subch}$ sub-channels for the resource pool.

$$N_{PSSCH}^{PSFCH}$$

may be a number of PSSCH slots associated with a PSFCH slot, which may be determined based on periodPSFCHresource. Furthermore, $$M_{PRB,set}^{PSFCH} = \alpha \cdot N_{subch} \cdot N_{PSSCH}^{PSFCH},$$

and $$M_{subch,slot}^{PSFCH} = \frac{M_{PRB,set}^{PSFCH}}{N_{subch} \cdot N_{PSSCH}^{PSFCH}}.$$

Figure 11:
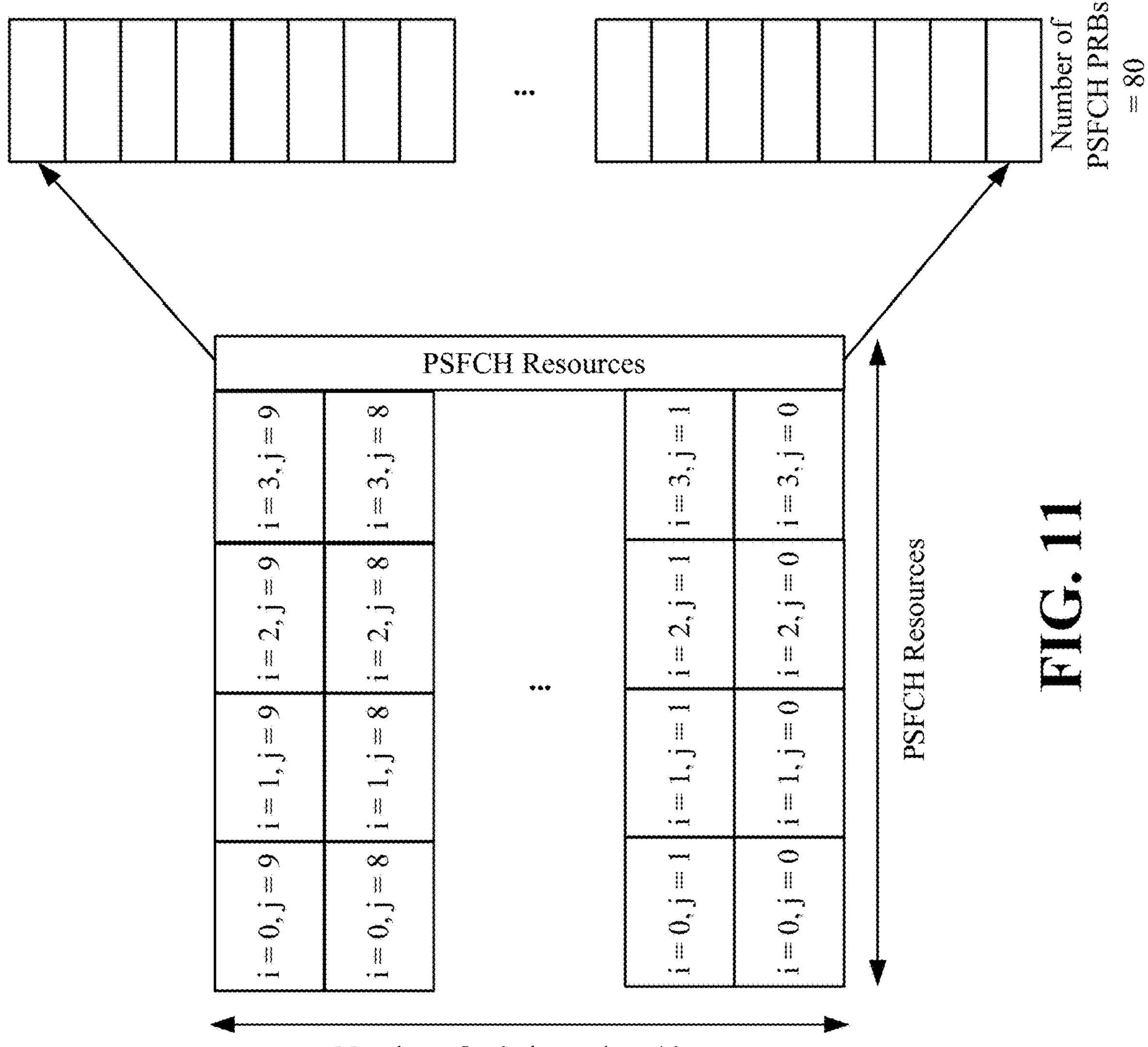
FIG. 11 is a diagram illustrating example PSFCH resource determination.

FIG. 11 is a diagram 1100 illustrating example PSFCH resource determination. The UE may allocate the $$\left[\left(i + j \cdot N_{PSSCH}^{PSFCH}\right) \cdot M_{subch,slot}^{PSFCH}, \left(i + 1 + j \cdot N_{PSSCH}^{PSFCH}\right) \cdot M_{subchslot}^{PSFCH} - 1\right]$$

PRBs from $$M_{PRB,set}^{PSFCH}$$

PRBs to slot i and sub-channel j, where $$0 \le i \le N_{PSSCH}^{PSFCH} \text{ and } 0 \le j \le N_{subch}.$$

For example, as shown, $$N_{PSSCH}^{PSFCH} = 4$$

(i.e., PSFCH periodicity), $N_{subch}$=10 (the number of sub-channels for the resource pool), and $$M_{subch,slot}^{PSFCH} = 80/(4*10) = 2$$

(i.e., 80 PRBs for the PSFCH). It should be appreciated that each sub-channel may be associated with 2 PSFCH PRBs in this example. However, the UE may transmit the PSFCH on one of the 2 PSFCH PRBs.

Figure 12:
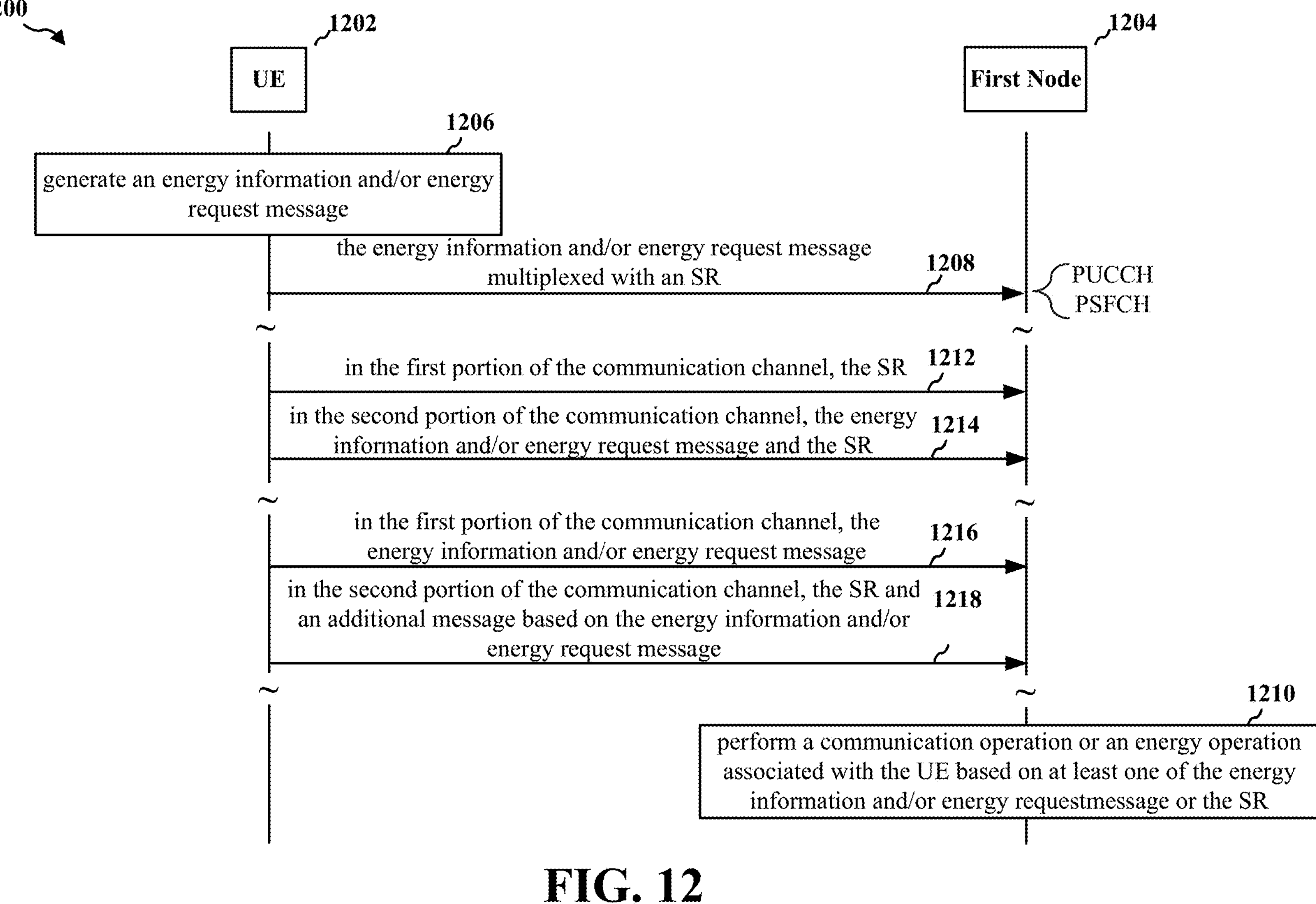
FIG. 12 is a diagram of a communication flow of a method of wireless communication.

FIG. 12 is a diagram of a communication flow 1200 of a method of wireless communication. The UE 1202 may implement aspects of the UE 104/350. In different configurations, the first node 1204 may implement aspects of the base station 102/310 or the UE 104/350. At 1206, the UE 1202 may generate an energy information and/or energy request message. The energy information and/or energy request message may be associated with the UE 1202.

At 1208, the UE 1202 may transmit, for a first node 1204, the energy information and/or energy request message multiplexed with an SR via a communication channel.

In one configuration, the first node 1204 may be a network entity (e.g., a base station 102/310). The communication channel may be the PUCCH.

In one configuration, the first node 1204 may be a second UE. The communication channel may be the PSFCH.

In one or more configurations, the communication channel may be one of a PUCCH or a PSFCH. In one configuration, the PUCCH may be associated with a Format 0 or a Format 2. In another configuration, the PSFCH may be associated with the Format 0 or the Format 2.

In one configuration, the energy information and/or energy request message and the SR may be encoded jointly based on a joint CS.

In one configuration, the energy information and/or energy request message and the SR may be encoded separately based on respective CSs.

In one configuration, the transmission of the energy information and/or energy request message and the SR that are separately encoded may be associated with a same power level or different power levels.

In one configuration, the communication channel may be one of a PUCCH or a PSFCH. The PUCCH or the PSFCH may include one RB. The energy information and/or energy request message and the SR may be encoded separately on a per-RE basis.

In one configuration, the communication channel may be one of a PUCCH or a PSFCH. The PUCCH or the PSFCH may include more than one RB. The energy information and/or energy request message and the SR may be encoded separately on a per-RE basis or a per-RB basis.

In one configuration, the communication channel may include a first portion corresponding to a first set of symbols and a second portion corresponding to a second set of symbols.

In one configuration, a first priority associated with the SR may be greater than a second priority associated with the energy information and/or energy request message. To transmit, at 1208, for the first node 1204, the energy information and/or energy request message multiplexed with the SR via the communication channel, in one configuration, at 1212, the UE 1202 may transmit, for the first node 1204 and in the first portion of the communication channel, the SR.

At 1214, the UE 1202 may transmit, for the first node 1204 and in the second portion of the communication channel, the energy information and/or energy request message and the SR.

In one configuration, a second priority associated with the energy information and/or energy request message may be greater than a first priority associated with the SR. To transmit, at 1208, for the first node 1204, the energy information and/or energy request message multiplexed with the SR via the communication channel, in one configuration, at 1216, the UE 1202 may transmit, for the first node 1204 and in the first portion of the communication channel, the energy information and/or energy request message.

At 1218, the UE 1202 may transmit, for the first node 1204 and in the second portion of the communication channel, the SR and an additional message based on the energy information and/or energy request message.

At 1210, the first node 1204 may perform a communication operation or an energy operation associated with the UE 1202 based on at least one of the energy information and/or energy request message or the SR.

In one configuration, one of the energy information and/or energy request message or the SR associated with a higher priority may be associated with more REs or RBs of the communication channel than the other of the energy information and/or energy request message or the SR.

In one configuration, a number of the REs or the RBs associated with each of the energy information and/or energy request message or the SR may be preconfigured or based on a preconfigured coding rate.

Various aspects of the disclosure may be applicable to the Uu link/interface, the sidelink (i.e., the PC5 interface), or a new link (new interface) that may be used together with an energy harvesting UE or device. In different configurations, the L1/L2/L3 indications, configurations, or signals may be associated with any of the above-described interfaces/links. Modulations, waveforms and channel coding of such links/interfaces may be similar to those of LTE, NR, or may be of a new and different type (e.g., OOK-based communications, FSK-based communication, Chirp-based Communications, or any combination thereof). In some examples, the waveform may be a CP-OFDM, DFT-s-OFDM, or any OFDM-based waveform, or a single carrier or tone waveform.

FIG. 13 is a flowchart 1300 of a method of wireless communication. The method may be performed by a UE (e.g., the UE 104/350/1202; the apparatus 1704). At 1302, the UE may generate an energy information and/or energy request message. The energy information and/or energy request message may be associated with the UE. For example, 1302 may be performed by the component 198 in FIG. 17. Referring to FIG. 12, at 1206, the UE 1202 may generate an energy information and/or energy request message.

Figure 14:
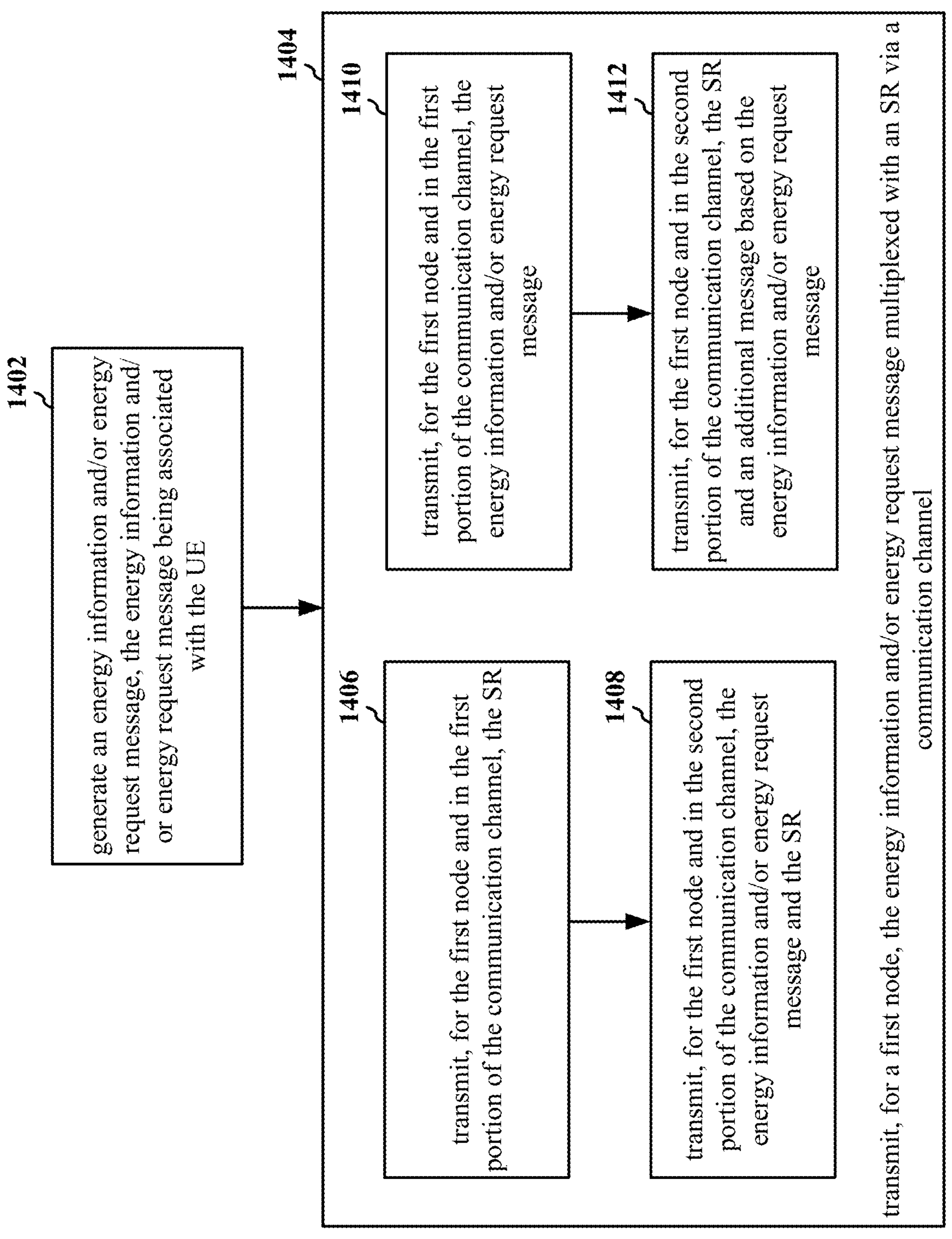
FIG. 14 is a flowchart of a method of wireless communication.

At 1304, the UE may transmit, for a first node, the energy information and/or energy request message multiplexed with an SR via a communication channel. For example, 1304 may be performed by the component 198 in FIG. 17. Referring to FIG. 12, at 1208, the UE 1202 may transmit, for a first node 1204, the energy information and/or energy request message multiplexed with an SR via a communication channel. FIG. 14 is a flowchart 1400 of a method of wireless communication. The method may be performed by a UE (e.g., the UE 104/350/1202; the apparatus 1704). At 1402, the UE may generate an energy information and/or energy request message. The energy information and/or energy request message may be associated with the UE. For example, 1402 may be performed by the component 198 in FIG. 17. Referring to FIG. 12, at 1206, the UE 1202 may generate an energy information and/or energy request message.

At 1404, the UE may transmit, for a first node, the energy information and/or energy request message multiplexed with an SR via a communication channel. For example, 1404 may be performed by the component 198 in FIG. 17. Referring to FIG. 12, at 1208, the UE 1202 may transmit, for a first node 1204, the energy information and/or energy request message multiplexed with an SR via a communication channel.

In one configuration, referring to FIG. 12, the first node 1204 may be a network entity. The communication channel may be the PUCCH.

In one configuration, referring to FIG. 12, the first node 1204 may be a second UE. The communication channel may be the PSFCH.

In one or more configurations, the communication channel may be one of a PUCCH or a PSFCH. The PUCCH may be associated with a Format 0 or a Format 2. The PSFCH may be associated with the Format 0 or the Format 2.

In one configuration, the energy information and/or energy request message and the SR may be encoded jointly based on a joint CS.

In one configuration, the energy information and/or energy request message and the SR may be encoded separately based on respective CSs.

In one configuration, the transmission of the energy information and/or energy request message and the SR that are separately encoded may be associated with a same power level or different power levels.

In one configuration, the communication channel may be one of a PUCCH or a PSFCH. The PUCCH or the PSFCH may include one RB. The energy information and/or energy request message and the SR may be encoded separately on a per-RE basis.

In one configuration, the communication channel may be one of a PUCCH or a PSFCH. The PUCCH or the PSFCH may include more than one RB. The energy information and/or energy request message and the SR may be encoded separately on a per-RE basis or a per-RB basis.

In one configuration, the communication channel may include a first portion corresponding to a first set of symbols and a second portion corresponding to a second set of symbols.

In one configuration, a first priority associated with the SR may be greater than a second priority associated with the energy information and/or energy request message. To transmit, at 1404, for the first node, the energy information and/or energy request message multiplexed with the SR via the communication channel, in one configuration, at 1406, the UE may transmit, for the first node and in the first portion of the communication channel, the SR. For example, 1406 may be performed by the component 198 in FIG. 17. Referring to FIG. 12, at 1212, the UE 1202 may transmit, for the first node 1204 and in the first portion of the communication channel, the SR.

At 1408, the UE may transmit, for the first node and in the second portion of the communication channel, the energy information and/or energy request message and the SR. For example, 1408 may be performed by the component 198 in FIG. 17. Referring to FIG. 12, at 1214, the UE 1202 may transmit, for the first node 1204 and in the second portion of the communication channel, the energy information and/or energy request message and the SR.

In one configuration, a second priority associated with the energy information and/or energy request message may be greater than a first priority associated with the SR. To transmit, at 1404, for the first node, the energy information and/or energy request message multiplexed with the SR via the communication channel, in one configuration, at 1410, the UE may transmit, for the first node and in the first portion of the communication channel, the energy information and/or energy request message. For example, 1410 may be performed by the component 198 in FIG. 17. Referring to FIG. 12, at 1216, the UE 1202 may transmit, for the first node 1204 and in the first portion of the communication channel, the energy information and/or energy request message.

At 1412, the UE may transmit, for the first node and in the second portion of the communication channel, the SR and an additional message based on the energy information and/or energy request message. For example, 1412 may be performed by the component 198 in FIG. 17. Referring to FIG. 12, at 1218, the UE 1202 may transmit, for the first node 1204 and in the second portion of the communication channel, the SR and an additional message based on the energy information and/or energy request message.

In one configuration, one of the energy information and/or energy request message or the SR associated with a higher priority may be associated with more REs or RBs of the communication channel than the other of the energy information and/or energy request message or the SR.

In one configuration, a number of the REs or the RBs associated with each of the energy information and/or energy request message or the SR may be preconfigured or based on a preconfigured coding rate.

Figure 15:
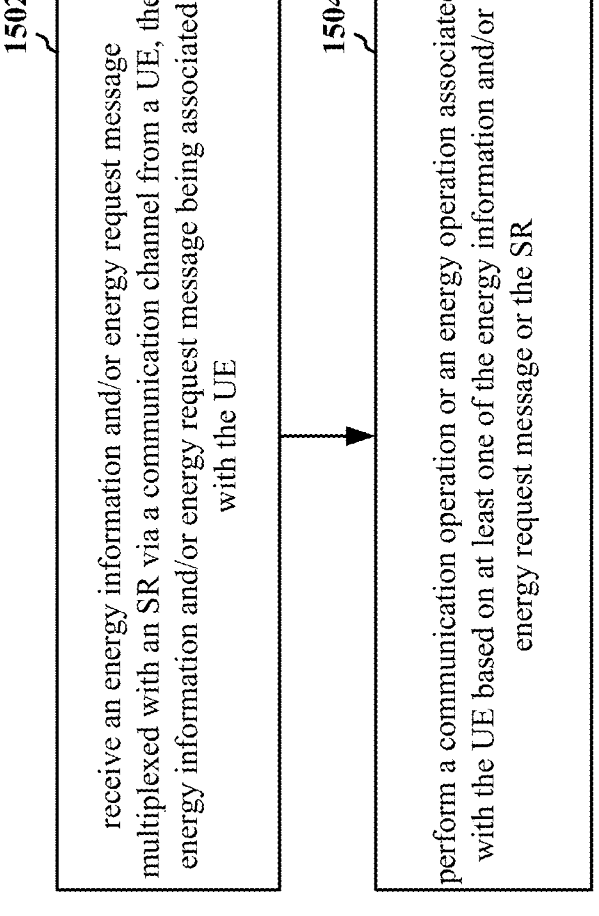
FIG. 15 is a flowchart of a method of wireless communication.

FIG. 15 is a flowchart 1500 of a method of wireless communication. The method may be performed by a first node (e.g., the base station 102/350; the UE 104/350; the first node 1204; the network entity 1702/1802). At 1502, the first node may receive an energy information and/or energy request message multiplexed with an SR via a communication channel from a UE. The energy information and/or energy request message may be associated with the UE. For example, 1502 may be performed by the component 199 in FIG. 18. Referring to FIG. 12, at 1208, the first node 1204 may receive an energy information and/or energy request message multiplexed with an SR via a communication channel from a UE 1202.

At 1504, the first node may perform a communication operation or an energy operation associated with the UE based on at least one of the energy information and/or energy request message or the SR. For example, 1504 may be performed by the component 199 in FIG. 18. Referring to FIG. 12, at 1210, the first node 1204 may perform a communication operation or an energy operation associated with the UE 1202 based on at least one of the energy information and/or energy request message or the SR.

Figure 16:
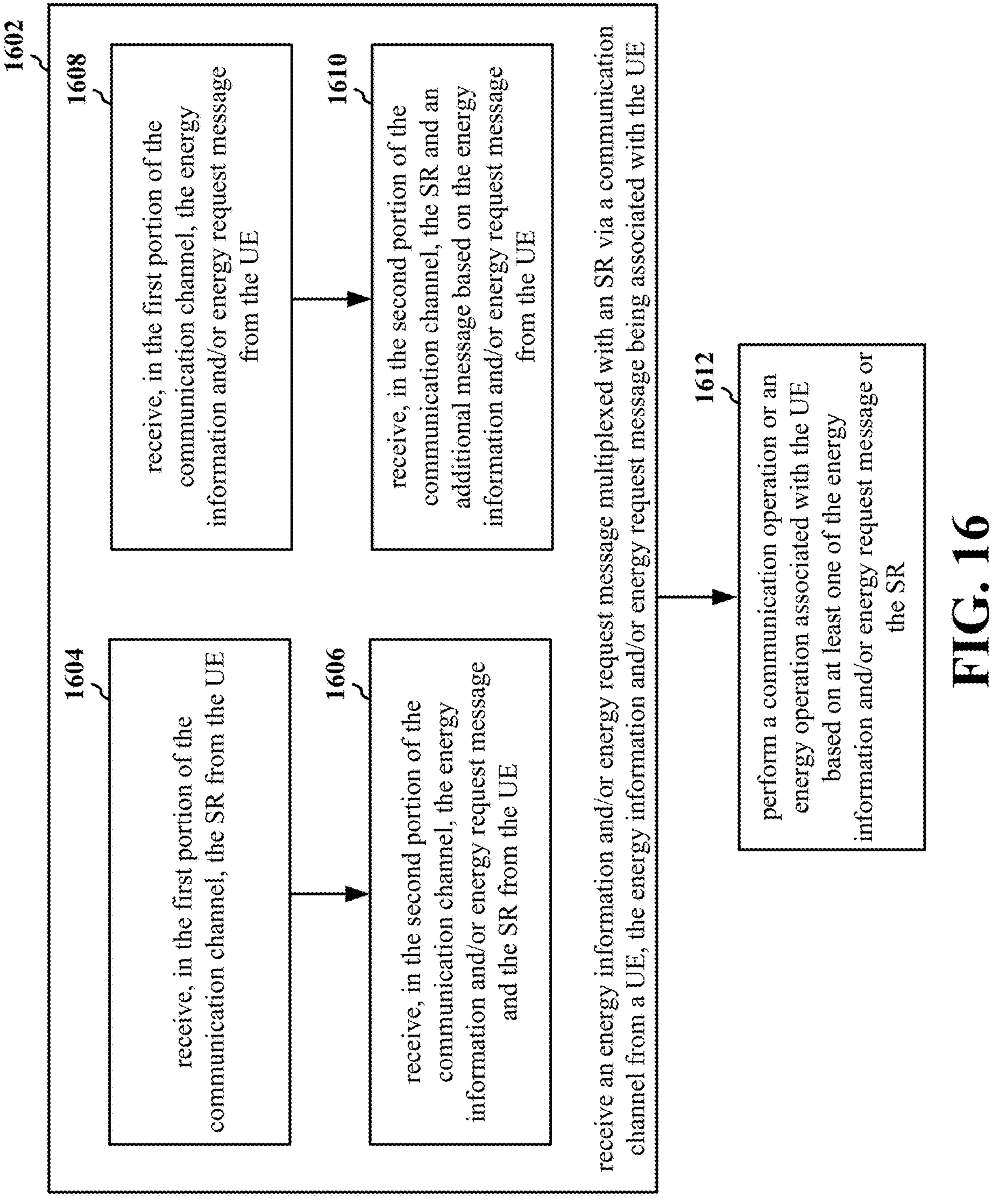
FIG. 16 is a flowchart of a method of wireless communication.

FIG. 16 is a flowchart 1600 of a method of wireless communication. The method may be performed by a first node (e.g., the base station 102/350; the UE 104/350; the first node 1204; the network entity 1702/1802). At 1602, the first node may receive an energy information and/or energy request message multiplexed with an SR via a communication channel from a UE. The energy information and/or energy request message may be associated with the UE. For example, 1602 may be performed by the component 199 in FIG. 18. Referring to FIG. 12, at 1208, the first node 1204 may receive an energy information and/or energy request message multiplexed with an SR via a communication channel from a UE 1202.

At 1612, the first node may perform a communication operation or an energy operation associated with the UE based on at least one of the energy information and/or energy request message or the SR. For example, 1612 may be performed by the component 199 in FIG. 18. Referring to FIG. 12, at 1210, the first node 1204 may perform a communication operation or an energy operation associated with the UE 1202 based on at least one of the energy information and/or energy request message or the SR.

In one configuration, referring to FIG. 12, the first node 1204 may be a network entity. The communication channel may be the PUCCH.

In one configuration, referring to FIG. 12, the first node 1204 may be a second UE. The communication channel may be the PSFCH.

In one or more configurations, the communication channel may be one of a PUCCH or a PSFCH. The PUCCH may be associated with a Format 0 or a Format 2. The PSFCH may be associated with the Format 0 or the Format 2.

In one configuration, the energy information and/or energy request message and the SR may be encoded jointly based on a joint CS.

In one configuration, the energy information and/or energy request message and the SR may be encoded separately based on respective CSs.

In one configuration, the energy information and/or energy request message and the SR that are separately encoded may be associated with a same power level or different power levels.

In one configuration, the communication channel may be one of a PUCCH or a PSFCH. The PUCCH or the PSFCH may include one RB. The energy information and/or energy request message and the SR may be encoded separately on a per-RE basis.

In one configuration, the communication channel may be one of a PUCCH or a PSFCH. The PUCCH or the PSFCH may include more than one RB. The energy information and/or energy request message and the SR may be encoded separately on a per-RE basis or a per-RB basis.

In one configuration, the communication channel may include a first portion corresponding to a first set of symbols and a second portion corresponding to a second set of symbols.

In one configuration, a first priority associated with the SR may be greater than a second priority associated with the energy information and/or energy request message. To receive, at 1602, the energy information and/or energy request message multiplexed with the SR via the communication channel from the UE, in one configuration, at 1604, the first node may receive, in the first portion of the communication channel, the SR from the UE. For example, 1604 may be performed by the component 199 in FIG. 18. Referring to FIG. 12, at 1212, the first node 1204 may receive, in the first portion of the communication channel, the SR from the UE 1202.

At 1606, the first node may receive, in the second portion of the communication channel, the energy information and/or energy request message and the SR from the UE. For example, 1606 may be performed by the component 199 in FIG. 18. Referring to FIG. 12, at 1214, the first node 1204 may receive, in the second portion of the communication channel, the energy information and/or energy request message and the SR from the UE 1202.

In one configuration, a second priority associated with the energy information and/or energy request message may be greater than a first priority associated with the SR. To receive, at 1602, the energy information and/or energy request message multiplexed with the SR via the communication channel from the UE, in one configuration, at 1608, the first node may receive, in the first portion of the communication channel, the energy information and/or energy request message from the UE. For example, 1608 may be performed by the component 199 in FIG. 18. Referring to FIG. 12, at 1216, the first node 1204 may receive, in the first portion of the communication channel, the energy information and/or energy request message from the UE 1202.

At 1610, the first node may receive, in the second portion of the communication channel, the SR and an additional message based on the energy information and/or energy request message from the UE. For example, 1610 may be performed by the component 199 in FIG. 18. Referring to FIG. 12, at 1218, the first node 1204 may receive, in the second portion of the communication channel, the SR and an additional message based on the energy information and/or energy request message from the UE 1202.

In one configuration, one of the energy information and/or energy request message or the SR associated with a higher priority may be associated with more REs or RBs of the communication channel than the other of the energy information and/or energy request message or the SR.

In one configuration, a number of the REs or the RBs associated with each of the energy information and/or energy request message or the SR may be preconfigured or based on a preconfigured coding rate.

Figure 17:
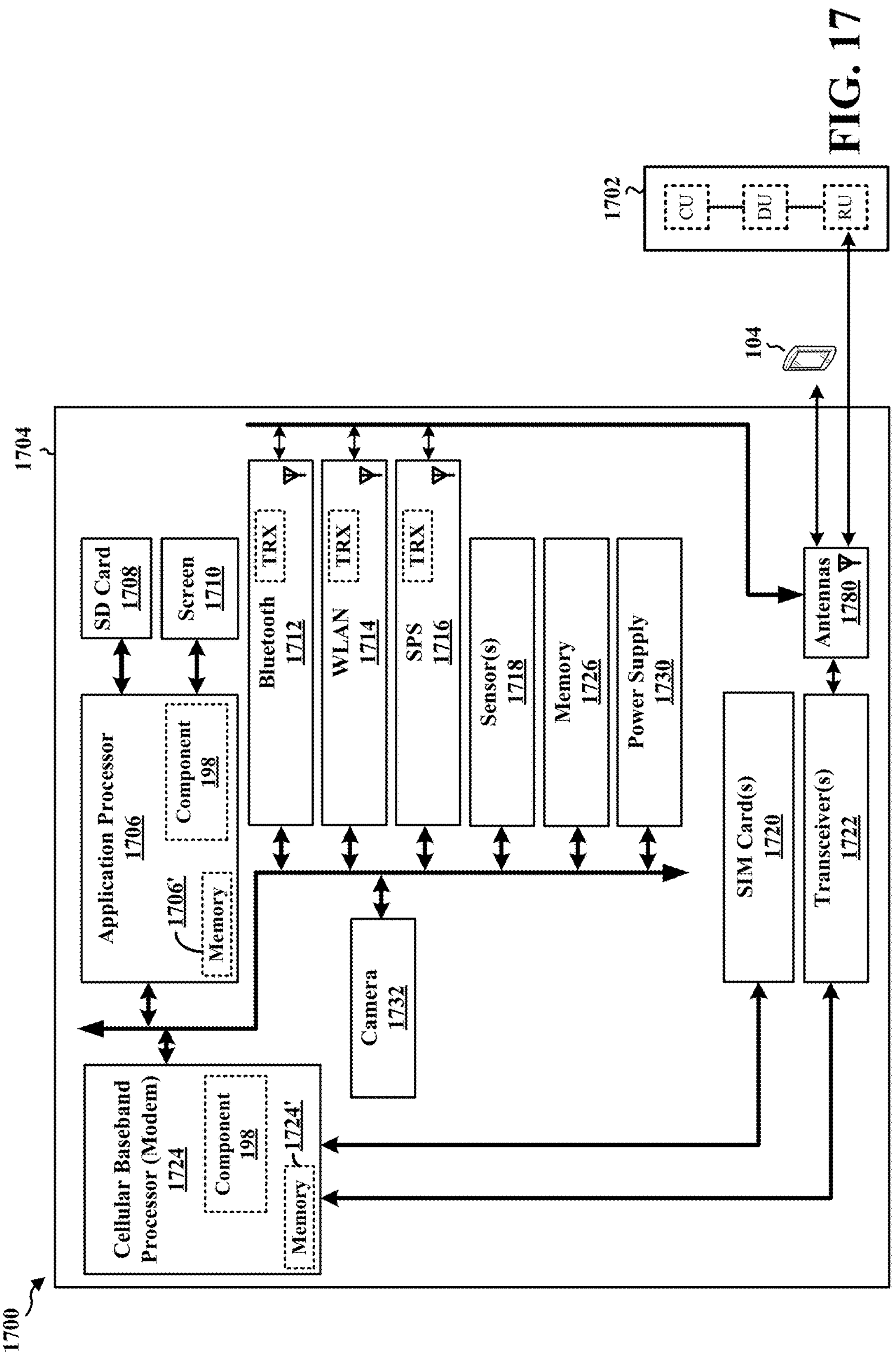
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see UE 350 of FIG. 3) and include the additional modules of the apparatus 1704.

As discussed supra, the component 198 may be configured to generate an energy information and/or energy request message. The energy information and/or energy request message may be associated with the UE. The component 198 may be configured to transmit, for a first node, the energy information and/or energy request message multiplexed with an SR via a communication channel. The component 198 may be within the cellular baseband processor 1724, the application processor 1706, or both the cellular baseband processor 1724 and the application processor 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, may include means for generating an energy information and/or energy request message. The energy information and/or energy request message may be associated with the UE. The apparatus 1704, and in particular the cellular baseband processor 1724 and/or the application processor 1706, may include means for transmitting, for a first node, the energy information and/or energy request message multiplexed with an SR via a communication channel.

In one configuration, the first node may be a network entity. The communication channel may be the PUCCH. In one configuration, the first node may be a second UE. The communication channel may be the PSFCH. In one or more configurations, the communication channel may be one of a PUCCH or a PSFCH. The PUCCH may be associated with a Format 0 or a Format 2. The PSFCH may be associated with the Format 0 or the Format 2. In one configuration, the energy information and/or energy request message and the SR may be encoded jointly based on a joint CS. In one configuration, the energy information and/or energy request message and the SR may be encoded separately based on respective CSs. In one configuration, the transmission of the energy information and/or energy request message and the SR that are separately encoded may be associated with a same power level or different power levels. In one configuration, the communication channel may be one of a PUCCH or a PSFCH. The PUCCH or the PSFCH may include one RB. The energy information and/or energy request message and the SR may be encoded separately on a per-RE basis. In one configuration, the communication channel may be one of a PUCCH or a PSFCH. The PUCCH or the PSFCH may include more than one RB. The energy information and/or energy request message and the SR may be encoded separately on a per-RE basis or a per-RB basis. In one configuration, the communication channel may include a first portion corresponding to a first set of symbols and a second portion corresponding to a second set of symbols. In one configuration, a first priority associated with the SR may be greater than a second priority associated with the energy information and/or energy request message. The means for transmitting, for the first node, the energy information and/or energy request message multiplexed with the SR via the communication channel may be further configured to transmit, for the first node and in the first portion of the communication channel, the SR. The means for transmitting, for the first node, the energy information and/or energy request message multiplexed with the SR via the communication channel may be further configured to transmit, for the first node and in the second portion of the communication channel, the energy information and/or energy request message and the SR. In one configuration, a second priority associated with the energy information and/or energy request message may be greater than a first priority associated with the SR. The means for transmitting, for the first node, the energy information and/or energy request message multiplexed with the SR via the communication channel may be further configured to transmit, for the first node and in the first portion of the communication channel, the energy information and/or energy request message. The means for transmitting, for the first node, the energy information and/or energy request message multiplexed with the SR via the communication channel may be further configured to transmit, for the first node and in the second portion of the communication channel, the SR and an additional message based on the energy information and/or energy request message. In one configuration, one of the energy information and/or energy request message or the SR associated with a higher priority may be associated with more REs or RBs of the communication channel than the other of the energy information and/or energy request message or the SR. In one configuration, a number of the REs or the RBs associated with each of the energy information and/or energy request message or the SR may be preconfigured or based on a preconfigured coding rate.

The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
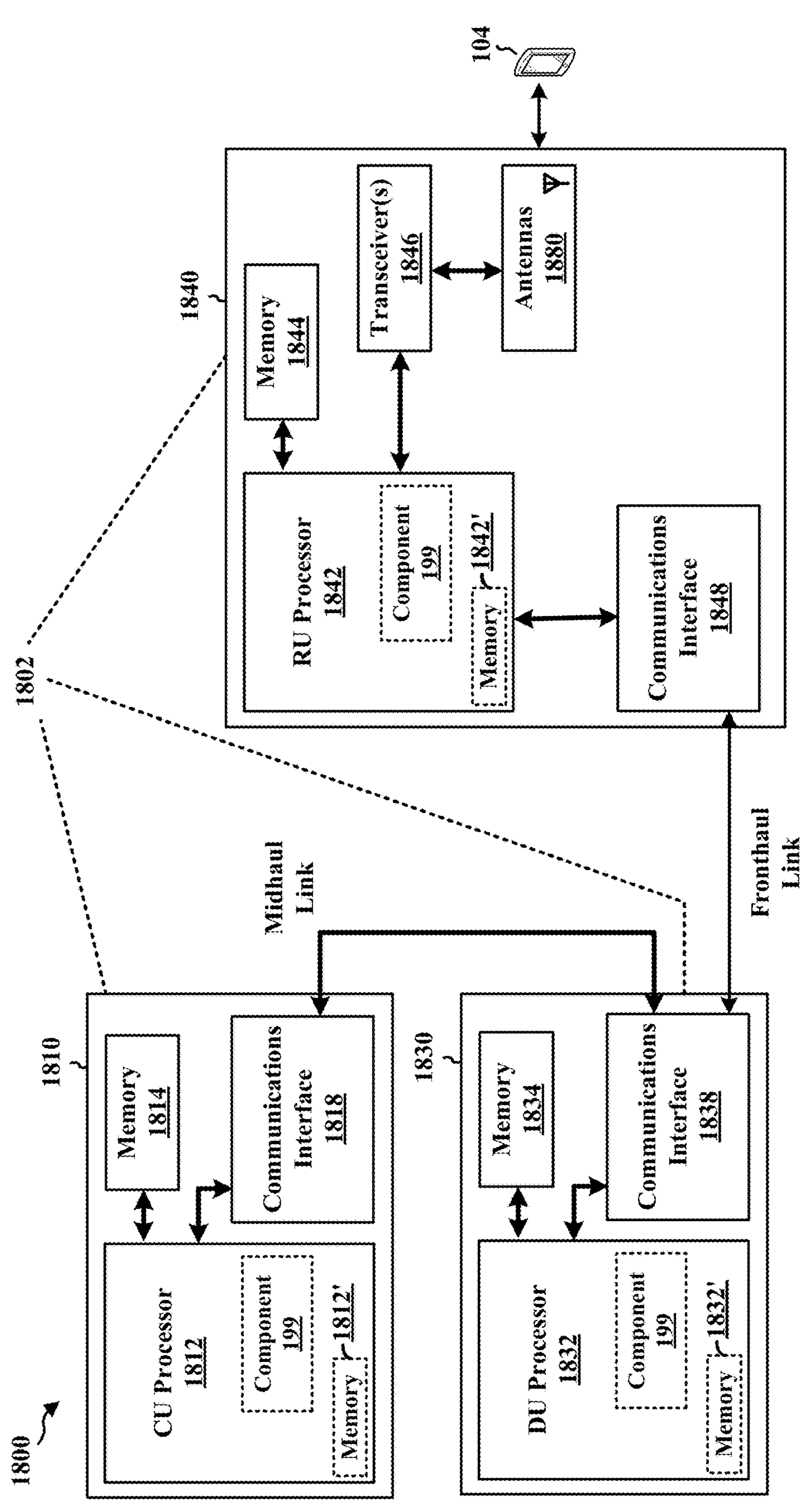
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive an energy information and/or energy request message multiplexed with an SR via a communication channel from a UE. The energy information and/or energy request message may be associated with the UE. The component 199 may be configured to perform a communication operation or an energy operation associated with the UE based on at least one of the energy information and/or energy request message or the SR. The component 199 may be within one or more processors of one or more of the CU 1810, DU 1830, and the RU 1840. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 may include means for receiving an energy information and/or energy request message multiplexed with an SR via a communication channel from a UE. The energy information and/or energy request message may be associated with the UE. The network entity 1802 may include means for performing a communication operation or an energy operation associated with the UE based on at least one of the energy information and/or energy request message or the SR.

In one configuration, the first node may be a network entity. The communication channel may be the PUCCH. In one configuration, the first node may be a second UE. The communication channel may be the PSFCH. In one or more configurations, the communication channel may be one of a PUCCH or a PSFCH. The PUCCH may be associated with a Format 0 or a Format 2. The PSFCH may be associated with the Format 0 or the Format 2. In one configuration, the energy information and/or energy request message and the SR may be encoded jointly based on a joint CS. In one configuration, the energy information and/or energy request message and the SR may be encoded separately based on respective CSs. In one configuration, the energy information and/or energy request message and the SR that are separately encoded may be associated with a same power level or different power levels. In one configuration, the communication channel may be one of a PUCCH or a PSFCH. The PUCCH or the PSFCH may include one RB. The energy information and/or energy request message and the SR may be encoded separately on a per-RE basis. In one configuration, the communication channel may be one of a PUCCH or a PSFCH. The PUCCH or the PSFCH may include more than one RB. The energy information and/or energy request message and the SR may be encoded separately on a per-RE basis or a per-RB basis. In one configuration, the communication channel may include a first portion corresponding to a first set of symbols and a second portion corresponding to a second set of symbols. In one configuration, a first priority associated with the SR may be greater than a second priority associated with the energy information and/or energy request message. The means for receiving the energy information and/or energy request message multiplexed with the SR via the communication channel from the UE may be further configured to receive, in the first portion of the communication channel, the SR from the UE. The means for receiving the energy information and/or energy request message multiplexed with the SR via the communication channel from the UE may be further configured to receive, in the second portion of the communication channel, the energy information and/or energy request message and the SR from the UE. In one configuration, a second priority associated with the energy information and/or energy request message may be greater than a first priority associated with the SR. The means for receiving the energy information and/or energy request message multiplexed with the SR via the communication channel from the UE may be further configured to receive, in the first portion of the communication channel, the energy information and/or energy request message from the UE. The means for receiving the energy information and/or energy request message multiplexed with the SR via the communication channel from the UE may be further configured to receive, in the second portion of the communication channel, the SR and an additional message based on the energy information and/or energy request message from the UE. In one configuration, one of the energy information and/or energy request message or the SR associated with a higher priority may be associated with more REs or RBs of the communication channel than the other of the energy information and/or energy request message or the SR. In one configuration, a number of the REs or the RBs associated with each of the energy information and/or energy request message or the SR may be preconfigured or based on a preconfigured coding rate.

The means may be the component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-18, a UE may generate an energy information and/or energy request message. The energy information and/or energy request message may be associated with the UE. The UE may transmit, for a first node, the energy information and/or energy request message multiplexed with an SR via a communication channel. The first node may perform a communication operation or an energy operation associated with the UE based on at least one of the energy information or energy request message or the SR. Accordingly, an energy harvesting device with limited energy storage capabilities may transmit the energy information and/or energy request message in an energy efficient manner.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including generating an energy information or energy request message, the energy information or energy request message being associated with the UE; and transmitting, for a first node, the energy information or energy request message multiplexed with an SR via a communication channel.

Aspect 2 is the method of aspect 1, where the first node is a network entity, and the communication channel is the PUCCH.

Aspect 3 is the method of aspect 1, where the first node is a second UE, and the communication channel is the PSFCH.

Aspect 4 is the method of any of aspects 1 to 3, where the communication channel is one of a PUCCH or a PSFCH, the PUCCH is associated with a Format 0 or a Format 2, or the PSFCH is associated with the Format 0 or the Format 2.

Aspect 5 is the method of any of aspects 1 to 4, where the energy information or energy request message and the SR are encoded jointly based on a joint CS.

Aspect 6 is the method of any of aspects 1 to 4, where the energy information or energy request message and the SR are encoded separately based on respective CSs.

Aspect 7 is the method of aspect 6, where the transmission of the energy information or energy request message and the SR that are separately encoded is associated with a same power level or different power levels.

Aspect 8 is the method of any of aspects 1 to 4, where the communication channel is one of a PUCCH or a PSFCH, the PUCCH or the PSFCH includes one RB, and the energy information or energy request message and the SR are encoded separately on a per-RE basis.

Aspect 9 is the method of any of aspects 1 to 4, where the communication channel is one of a PUCCH or a PSFCH, the PUCCH or the PSFCH includes more than one RB, and the energy information or energy request message and the SR are encoded separately on a per-RE basis or a per-RB basis.

Aspect 10 is the method of any of aspects 1 to 9, where the communication channel includes a first portion corresponding to a first set of symbols and a second portion corresponding to a second set of symbols.

Aspect 11 is the method of aspect 10, where a first priority associated with the SR is greater than a second priority associated with the energy information or energy request message, and the transmitting, for the first node, the energy information or energy request message multiplexed with the SR via the communication channel further includes: transmitting, for the first node and in the first portion of the communication channel, the SR; and transmitting, for the first node and in the second portion of the communication channel, the energy information or energy request message and the SR.

Aspect 12 is the method of aspect 10, where a second priority associated with the energy information or energy request message is greater than a first priority associated with the SR, and the transmitting, for the first node, the energy information or energy request message multiplexed with the SR via the communication channel further includes: transmitting, for the first node and in the first portion of the communication channel, the energy information or energy request message; and transmitting, for the first node and in the second portion of the communication channel, the SR and an additional message based on the energy information or energy request message.

Aspect 13 is the method of any of aspects 1 to 12, where one of the energy information or energy request message or the SR associated with a higher priority is associated with more REs or RBs of the communication channel than the other of the energy information or energy request message or the SR.

Aspect 14 is the method of aspect 13, where a number of the REs or the RBs associated with each of the energy information or energy request message or the SR is preconfigured or based on a preconfigured coding rate.

Aspect 15 is a method of wireless communication at a first node, including receiving an energy information or energy request message multiplexed with an SR via a communication channel from a UE, the energy information or energy request message being associated with the UE; and performing a communication operation or an energy operation associated with the UE based on at least one of the energy information or energy request message or the SR.

Aspect 16 is the method of aspect 15, where the first node is a network entity, and the communication channel is the PUCCH.

Aspect 17 is the method of aspect 15, where the first node is a second UE, and the communication channel is the PSFCH.

Aspect 18 is the method of any of aspects 15 to 17, where the communication channel is one of a PUCCH or a PSFCH, the PUCCH is associated with a Format 0 or a Format 2, or the PSFCH is associated with the Format 0 or the Format 2.

Aspect 19 is the method of any of aspects 15 to 18, where the energy information or energy request message and the SR are encoded jointly based on a joint CS.

Aspect 20 is the method of any of aspects 15 to 18, where the energy information or energy request message and the SR are encoded separately based on respective CSs.

Aspect 21 is the method of aspect 20, where the energy information or energy request message and the SR that are separately encoded is associated with a same power level or different power levels.

Aspect 22 is the method of any of aspects 15 to 18, where the communication channel is one of a PUCCH or a PSFCH, the PUCCH or the PSFCH includes one RB, and the energy information or energy request message and the SR are encoded separately on a per-RE basis.

Aspect 23 is the method of any of aspects 15 to 18, where the communication channel is one of a PUCCH or a PSFCH, the PUCCH or the PSFCH includes more than one RB, and the energy information or energy request message and the SR are encoded separately on a per-RE basis or a per-RB basis.

Aspect 24 is the method of any of aspects 15 to 23, where the communication channel includes a first portion corresponding to a first set of symbols and a second portion corresponding to a second set of symbols.

Aspect 25 is the method of aspect 24, where a first priority associated with the SR is greater than a second priority associated with the energy information or energy request message, and the receiving the energy information or energy request message multiplexed with the SR via the communication channel from the UE further includes: receiving, in the first portion of the communication channel, the SR from the UE; and receiving, in the second portion of the communication channel, the energy information or energy request message and the SR from the UE.

Aspect 26 is the method of aspect 24, where a second priority associated with the energy information or energy request message is greater than a first priority associated with the SR, and the receiving the energy information or energy request message multiplexed with the SR via the communication channel from the UE further includes: receiving, in the first portion of the communication channel, the energy information or energy request message from the UE; and receive, in the second portion of the communication channel, the SR and an additional message based on the energy information or energy request message from the UE.

Aspect 27 is the method of any of aspects 15 to 26, where one of the energy information or energy request message or the SR associated with a higher priority is associated with more REs or RBs of the communication channel than the other of the energy information or energy request message or the SR.

Aspect 28 is the method of aspect 27, where a number of the REs or the RBs associated with each of the energy information or energy request message or the SR is preconfigured or based on a preconfigured coding rate.

Aspect 29 is an apparatus for wireless communication including at least one processor coupled to a memory and, based at least in part on information stored in the memory, the at least one processor is configured to implement a method as in any of aspects 1 to 28.

Aspect 30 may be combined with aspect 29 and further includes a transceiver coupled to the at least one processor.

Aspect 31 is an apparatus for wireless communication including means for implementing any of aspects 1 to 28.

Aspect 32 is a non-transitory computer-readable storage medium storing computer executable code, where the code when executed by a processor causes the processor to implement any of aspects 1 to 28.

Various aspects have been described herein. These and other aspects are within the scope of the following claims.

What is claimed is:

1. An apparatus for wireless communication at a user equipment (UE), comprising:

memory; and at least one processor coupled to the memory and, based at least in part on information stored in the memory, the at least one processor is configured to:

generate an energy information or energy request message, the energy information or energy request message being associated with the UE;

transmit, for a first node, the energy information or energy request message multiplexed with a scheduling request (SR) via a communication channel, wherein the SR and at least one of the energy information or the energy request message are encoded, wherein the energy information is associated with an energy state of the UE and the energy request message is associated with at least one form of wireless energy;

wherein the communication channel includes a first portion corresponding to a first set of symbols and a second portion corresponding to a second set of symbols; and wherein a first priority associated with the SR is greater than a second priority associated with the energy information or energy request message, and to transmit, for the first node, the energy information or energy request message multiplexed with the SR via the communication channel, the at least one processor is further configured to:

transmit, for the first node and in the first portion of the communication channel, the SR; and transmit, for the first node and in the second portion of the communication channel, the energy information or energy request message and the SR.

2. The apparatus of claim 1, wherein the first node is a network entity, and the communication channel is a physical uplink control channel (PUCCH).

3. The apparatus of claim 1, wherein the first node is a second UE, and the communication channel is a physical sidelink feedback channel (PSFCH).

4. The apparatus of claim 1, wherein the communication channel is a physical uplink control channel (PUCCH) or a physical sidelink feedback channel (PSFCH), the PUCCH is associated with a Format 0 or a Format 2, or the PSFCH is associated with the Format 0 or the Format 2.

5. The apparatus of claim 1, wherein the energy information or energy request message and the SR are encoded jointly based on a joint cyclic shift (CS).

6. The apparatus of claim 1, wherein the energy information or energy request message and the SR are encoded separately based on respective cyclic shifts (CSs).

7. The apparatus of claim 6, wherein the transmission of the energy information or energy request message and the SR that are separately encoded is associated with a same power level or different power levels.

8. The apparatus of claim 1, wherein the communication channel is a physical uplink control channel (PUCCH) or a physical sidelink feedback channel (PSFCH), the PUCCH or the PSFCH includes one resource block (RB), and the energy information or energy request message and the SR are encoded separately on a per-resource element (RE) basis.

9. The apparatus of claim 1, wherein the communication channel is a physical uplink control channel (PUCCH) or a physical sidelink feedback channel (PSFCH), the PUCCH or the PSFCH includes more than one resource block (RB), and the energy information or energy request message and the SR are encoded separately on a per-resource element (RE) basis or a per-RB basis.

10. The apparatus of claim 1, wherein a second priority associated with the energy information or energy request message is greater than a first priority associated with the SR, and to transmit, for the first node, the energy information or energy request message multiplexed with the SR via the communication channel, the at least one processor is further configured to:

transmit, for the first node and in the first portion of the communication channel, the energy information or energy request message; and transmit, for the first node and in the second portion of the communication channel, the SR and an additional message based on the energy information or energy request message.

11. The apparatus of claim 1, wherein one of the energy information or energy request message or the SR associated with a higher priority is associated with more resource elements (REs) or resource blocks (RBs) of the communication channel than an other of the energy information or energy request message or the SR.

12. The apparatus of claim 11, further comprising a transceiver coupled to the at least one processor, wherein a number of the REs or the RBs associated with each of the energy information or energy request message or the SR is preconfigured or based on a preconfigured coding rate.

13. A method of wireless communication at a user equipment (UE), comprising:

generating an energy information or energy request message, the energy information or energy request message being associated with the UE;

transmitting, for a first node, the energy information or energy request message multiplexed with a scheduling request (SR) via a communication channel, wherein the SR and at least one of the energy information or the energy request message are encoded, wherein the energy information is associated with an energy state of the UE and the energy request message is associated with at least one form of wireless energy;

wherein the communication channel includes a first portion corresponding to a first set of symbols and a second portion corresponding to a second set of symbols; and wherein a first priority associated with the SR is greater than a second priority associated with the energy information or energy request message, and to transmit, for the first node, the energy information or energy request message multiplexed with the SR via the communication channel, the UE is further configured to:

transmit, for the first node and in the first portion of the communication channel, the SR; and transmit, for the first node and in the second portion of the communication channel, the energy information or energy request message and the SR.

14. An apparatus for wireless communication at a first node, comprising:

memory; and at least one processor coupled to the memory and, based at least in part on information stored in the memory, the at least one processor is configured to:

receive an energy information or energy request message multiplexed with a scheduling request (SR) via a communication channel from a user equipment (UE), the energy information or energy request message being associated with the UE, wherein the SR and at least one of the energy information or the energy request message are encoded, wherein the energy information is associated with an energy state of the UE and the energy request message is associated with at least one form of wireless energy;

perform a communication operation or an energy operation associated with the UE based on at least one of the energy information or energy request message or the SR;

wherein the communication channel includes a first portion corresponding to a first set of symbols and a second portion corresponding to a second set of symbols; and wherein a first priority associated with the SR is greater than a second priority associated with the energy information or energy request message, and to receive the energy information or energy request message multiplexed with the SR via the communication channel from the UE, the at least one processor is further configured to:
- receive, in the first portion of the communication channel, the SR from the UE; and
- receive, in the second portion of the communication channel, the energy information or energy request message and the SR from the UE.

15. The apparatus of claim 14, wherein the first node is a network entity, and the communication channel is a physical uplink control channel (PUCCH).

16. The apparatus of claim 14, wherein the first node is a second UE, and the communication channel is a physical sidelink feedback channel (PSFCH).

17. The apparatus of claim 14, wherein the communication channel is a physical uplink control channel (PUCCH) or a physical sidelink feedback channel (PSFCH), the PUCCH is associated with a Format 0 or a Format 2, or the PSFCH is associated with the Format 0 or the Format 2.

18. The apparatus of claim 14, wherein the energy information or energy request message and the SR are encoded jointly based on a joint cyclic shift (CS).

19. The apparatus of claim 14, wherein the energy information or energy request message and the SR are encoded separately based on respective cyclic shifts (CSs).

20. The apparatus of claim 19, wherein the energy information or energy request message and the SR that are separately encoded are associated with a same power level or different power levels.

21. The apparatus of claim 14, wherein the communication channel is a physical uplink control channel (PUCCH) or a physical sidelink feedback channel (PSFCH), the PUCCH or the PSFCH includes one resource block (RB), and the energy information or energy request message and the SR are encoded separately on a per-resource element (RE) basis.

22. The apparatus of claim 14, wherein the communication channel is a physical uplink control channel (PUCCH) or a physical sidelink feedback channel (PSFCH), the PUCCH or the PSFCH includes more than one resource block (RB), and the energy information or energy request message and the SR are encoded separately on a per-resource element (RE) basis or a per-RB basis.

23. The apparatus of claim 14, wherein a second priority associated with the energy information or energy request message is greater than a first priority associated with the SR, and to receive the energy information or energy request message multiplexed with the SR via the communication channel from the UE, the at least one processor is further configured to:
- receive, in the first portion of the communication channel, the energy information or energy request message from the UE; and
- receive, in the second portion of the communication channel, the SR and an additional message based on the energy information or energy request message from the UE.

24. The apparatus of claim 14, wherein one of the energy information or energy request message or the SR associated with a higher priority is associated with more resource elements (REs) or resource blocks (RBs) of the communication channel than an other of the energy information or energy request message or the SR.

25. The apparatus of claim 24, further comprising a transceiver coupled to the at least one processor, wherein a number of the REs or the RBs associated with each of the energy information or energy request message or the SR is preconfigured or based on a preconfigured coding rate.

26. A method of wireless communication at a first node, comprising:
- receiving an energy information or energy request message multiplexed with a scheduling request (SR) via a communication channel from a user equipment (UE), the energy information or energy request message being associated with the UE, wherein the SR and at least one of the energy information or the energy request message are encoded, wherein the energy information is associated with an energy state of the UE and the energy request message is associated with at least one form of wireless energy;
- performing a communication operation or an energy operation associated with the UE based on at least one of the energy information or energy request message or the SR;
- wherein the communication channel includes a first portion corresponding to a first set of symbols and a second portion corresponding to a second set of symbols; and
- wherein a first priority associated with the SR is greater than a second priority associated with the energy information or energy request message, and to receive the energy information or energy request message multiplexed with the SR via the communication channel from the UE, the at least one processor is further configured to:
  - receive, in the first portion of the communication channel, the SR from the UE; and
  - receive, in the second portion of the communication channel, the energy information or energy request message and the SR from the UE.

* * * * *